(12) United States Patent
House

(10) Patent No.: US 8,786,596 B2
(45) Date of Patent: Jul. 22, 2014

(54) VIEW POINT REPRESENTATION FOR 3-D SCENES

(75) Inventor: Gregory House, Doylestown, PA (US)

(73) Assignee: Disney Enterprises, Inc., Burbank, CA (US)

( * ) Notice: Subject to any disclaimer, the term of this patent is extended or adjusted under 35 U.S.C. 154(b) by 706 days.

(21) Appl. No.: 12/507,708

(22) Filed: Jul. 22, 2009

(65) Prior Publication Data

US 2010/0020068 A1    Jan. 28, 2010

Related U.S. Application Data

(60) Provisional application No. 61/083,049, filed on Jul. 23, 2008.

(51) Int. Cl.
| | |
|---|---|
| *G06T 15/00* | (2011.01) |
| *G09G 5/00* | (2006.01) |
| *G06T 15/10* | (2011.01) |
| *G06T 15/20* | (2011.01) |

(52) U.S. Cl.
CPC ............... *G06T 15/10* (2013.01); *G06T 15/20* (2013.01)
USPC ............ 345/419; 345/619; 345/632; 345/633

(58) Field of Classification Search
CPC ................................ G06T 15/10; G06T 15/20
USPC .................... 345/419, 619, 632, 633
See application file for complete search history.

(56) References Cited

U.S. PATENT DOCUMENTS

| | | | |
|---|---|---|---|
| 5,748,199 A * | 5/1998 | Palm ........................ | 345/473 |
| 5,808,695 A | 9/1998 | Rosser et al. | |
| 5,850,352 A * | 12/1998 | Moezzi et al. ............... | 345/419 |
| 6,100,925 A | 8/2000 | Rosser et al. | |
| 6,249,285 B1 * | 6/2001 | Madden et al. ............... | 345/419 |
| 6,529,613 B1 | 3/2003 | Astle | |
| 6,858,826 B2 * | 2/2005 | Mueller et al. ............. | 250/208.1 |
| 7,015,978 B2 | 3/2006 | Jeffers et al. | |
| 7,747,067 B2 * | 6/2010 | Popescu et al. ............... | 382/154 |

(Continued)

OTHER PUBLICATIONS

GameDev.Net: "Converting a Rotation to Spherical Coordinates," GameDev.Net Discussion Forums, Mar. 13, 2007; retrieved from the Internet: URL:http://www.gamedev.net/community/forms/topic.asp?topic_id+438961, retrieved on Nov. 12, 2009. 6 pages.

(Continued)

*Primary Examiner* — David T Welch
(74) *Attorney, Agent, or Firm* — Fay Kaplun & Marcin, LLP

(57) ABSTRACT

Techniques are described for deriving information, including graphical representations, based on perspectives of a 3D scene by utilizing sensor model representations of location points in the 3D scene. A 2D view point representation of a location point is derived based on the sensor model representation. From this information, a data representation can be determined. The 2D view point representation can be used to determine a second 2D view point representation. Other techniques include using sensor model representations of location points associated with dynamic objects in a 3D scene. These sensor model representations are generated using sensor systems having perspectives external to the location points and are used to determine a 3D model associated with a dynamic object. Data or graphical representations may be determined based on the 3D model. A system for obtaining information based on perspectives of a 3D scene includes a data manager and a renderer.

12 Claims, 17 Drawing Sheets

(56) References Cited

U.S. PATENT DOCUMENTS

| | | | |
|---|---|---|---|
| 7,920,959 B1* | 4/2011 | Williams | 701/117 |
| 2002/0050988 A1* | 5/2002 | Petrov et al. | 345/418 |
| 2004/0082870 A1* | 4/2004 | Rudy et al. | 600/509 |
| 2005/0046625 A1* | 3/2005 | Kawamoto | 345/419 |
| 2005/0052717 A1* | 3/2005 | Brotherton-Ratcliffe et al. | 359/15 |
| 2005/0152590 A1* | 7/2005 | Thieret et al. | 382/131 |
| 2006/0040738 A1* | 2/2006 | Okazaki et al. | 463/32 |
| 2006/0109266 A1* | 5/2006 | Itkowitz et al. | 345/419 |
| 2007/0242797 A1* | 10/2007 | Stewart et al. | 378/16 |
| 2007/0279415 A1* | 12/2007 | Sullivan et al. | 345/427 |
| 2008/0045331 A1* | 2/2008 | LeMay et al. | 463/25 |
| 2008/0158345 A1* | 7/2008 | Schklair et al. | 348/47 |
| 2008/0170118 A1* | 7/2008 | Albertson et al. | 348/46 |
| 2008/0228065 A1* | 9/2008 | Viswanathan et al. | 600/424 |
| 2010/0194862 A1* | 8/2010 | Givon | 348/49 |

OTHER PUBLICATIONS

Yongduek et al., "Auto-Calibration of a Rotating and Zooming Camera," Proc. of IAPR Workshop on Machine Vision Applications, 1998, pp. 1-4, XP-002559904.

PCT, "Notification of Transmittal of the International Search Report and the Written Opinion of the International Searching Authority or the Declaration," with International Search Report and Written Opinion of the International Search Authority; International Appln. No. PCT/US2009/004266, mailed Dec. 23, 2009, 12 pages.

U.S. Appl. No. 12/403,857, filed Mar. 13, 2009, Gefen et al.

U.S. Appl. No. 12/490,026, filed Jun. 23, 2009, House et al.

* cited by examiner

VIEW POINT REPRESENTATION FOR 3-D SCENES

CROSS REFERENCE TO RELATED APPLICATIONS

This application claims the benefit of U.S. Provisional Appl. No. 61/083,049, filed Jul. 23, 2008, which is hereby incorporated by reference in its entirety.

BACKGROUND

1. Field of Invention

This invention relates in general to processing three-dimensional (3D) image data.

2. Related Art

Multiple cameras can be used to observe a scene from different locations. The most common framework to combine information about the scene from multiple locations may be three-dimensional (3D) world Cartesian coordinates. While comprehensive in scope, the use of image processing based on 3D Cartesian coordinates may be a hindrance in situations where 3D understanding of the scene is limited. In addition, the processing of image data using 3D coordinates may involve retaining more information than necessary.

BRIEF SUMMARY

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

Embodiments described herein address problems associated with processing data derived from different locations within a three-dimensional (3D) world. An object's 3D position may be represented based on a viewpoint external to the scene. External viewpoints include view points of the scene as imaged by a camera or observed by an observer. Normalized direction vectors may be used to represent object positions observed from particular viewpoints. In some cases, two-dimensional (2D) angle coordinates may be used to represent object positions. Information may be obtained from a scene based on such representations. A relationship between direction vectors and camera models may be derived by rotating the Cartesian coordinate space and camera model.

According to an embodiment, a method for deriving information based on perspectives of a 3D scene may include receiving a sensor model representation of a location point in the 3D scene. The sensor model representation is generated using a sensor having a perspective external to the location point. The method may further include deriving a 2D view point representation of the location point based on the sensor model representation. The method may also include determining data representations, such as scene measurements, in the 3D scene involving the location point using the 2D view point representation.

According to another embodiment, there is provided a system for deriving information based on perspectives of a 3D scene. The system may include an object tracker configured to derive a 2D view point representation of a location point in a 3D scene. The sensor model representation is generated using a sensor having a perspective external to the location point. The system may further include a data manager configured to determine a data representation in the 3D scene involving the location point based upon the 2D view point representation. Graphical representations may also be generated based on a 3D model.

Different representations may also be unified, according to other embodiments. For example, the screen space of a camera or monitor may be the unifying mechanism. This screen space viewpoint may be used for storing and retrieving positional information about a scene. This is an effective approach for cameras fixed in space. The representation may be adjusted for tripod cameras if the screen space physically moves over time. The data gathered may be associated with camera model representation at certain points in time.

According to an embodiment, a method for unifying information from different perspectives in a 3D scene may include obtaining a first two dimensional (2D) view point representation of a location point based on a sensor model representation of a location point in the 3D scene. The sensor model representation is generated using a sensor having a perspective external to the location point. The method may further include determining a second 2D view point representation from the first 2D view point representation. This may be performed without finding 3D coordinates.

Some embodiments may perform mapping between cameras using 2D angle representations. For example, a view point to view point mapping may be performed using a point located on an arbitrary plane. This mapping may also be extended to handle a vector that is offset from the plane point. This may be applicable to modeling an object with physical 3D size. In some cases, a representation may be mapped to a plane tied to the position of an object on another plane. In other cases, 3D distances may be computed between planar points directly from 2D view point observations.

In other embodiments, a dynamic object may be represented by 3D models associated with a location point of the dynamic object or another dynamic object. The 3D models are comprised of one or more virtual surfaces that may have a fixed offset from the location point. The dynamic objects may be the scoring object, referees, athletes and athletic equipment. The 3D models may be used to describe the physical shape, pose and orientation of the dynamic object. Alternately, the 3D models may be used to describe the dynamic trajectory and path of the dynamic object. In an embodiment, a system may be configured to include a data manager that determines the 3D model of a dynamic object based on a sensor model representation. The system may be further configured to use the 3D model to generate a data representation by the data manager, or a graphical representation by a renderer.

Measurements may be translated between multiple view point positions, according to some embodiments. In some cases, observed measurements may be mapped from two view points into a third view point. This may address problems associated with determining explicit 3D shape of objects. This mapping may also be extended to measuring 3D distance in a pre-determined direction. In some cases, positions from RFID or GPS formulations may be represented.

Further embodiments, features, and advantages of the invention, as well as the structure and operation of the various embodiments of the invention are described in detail below with reference to accompanying drawings.

BRIEF DESCRIPTION OF THE FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Interest in organized sports continues to grow. This is spurred on, in part, by the efforts of professional leagues to engage fans. Broadcasters of sporting events typically deploy a plurality of cameras to capture images of the action in the games. Sports leagues have invested in the capturing of statistics during events to illustrate relative performance of players. Broadcasts of sporting events have been enriched by adding artificial video features, such as, for example, the virtual first-down line which has been employed partly as a means to bridge the gap between statistics and broadcast.

It is expected that the invention described in this patent document should enhance broadcast of an event and facilitate generation of statistics about the event. It presents a methodology for combining information from multiple perspectives around an arena or stadium. Potential applications of the invention include multimedia presentations covering sporting events.

A fixed view point (real or virtual) may be used to unify information from different perspectives of a 3D scene, according to an embodiment. Specifically, this mechanism may involve identifying a fixed location in space and deriving directional measurements of interesting locations in the scene from this fixed location. This approach has some specific operational advantages:

Closely matches the perspective of a tripod mounted camera.
Enables alignment precision to be optimized from a particular view point.
Simplifies storage and retrieval of information to 2D mapping.
Enables direct computation of 3D measurements from 2D mapping.
Simplifies image processing algorithms employed to derive measurements.
Functions in scenario where understanding of scene geometry is limited.
Handles information outside of the view port of cameras accurately.

Figure 1:
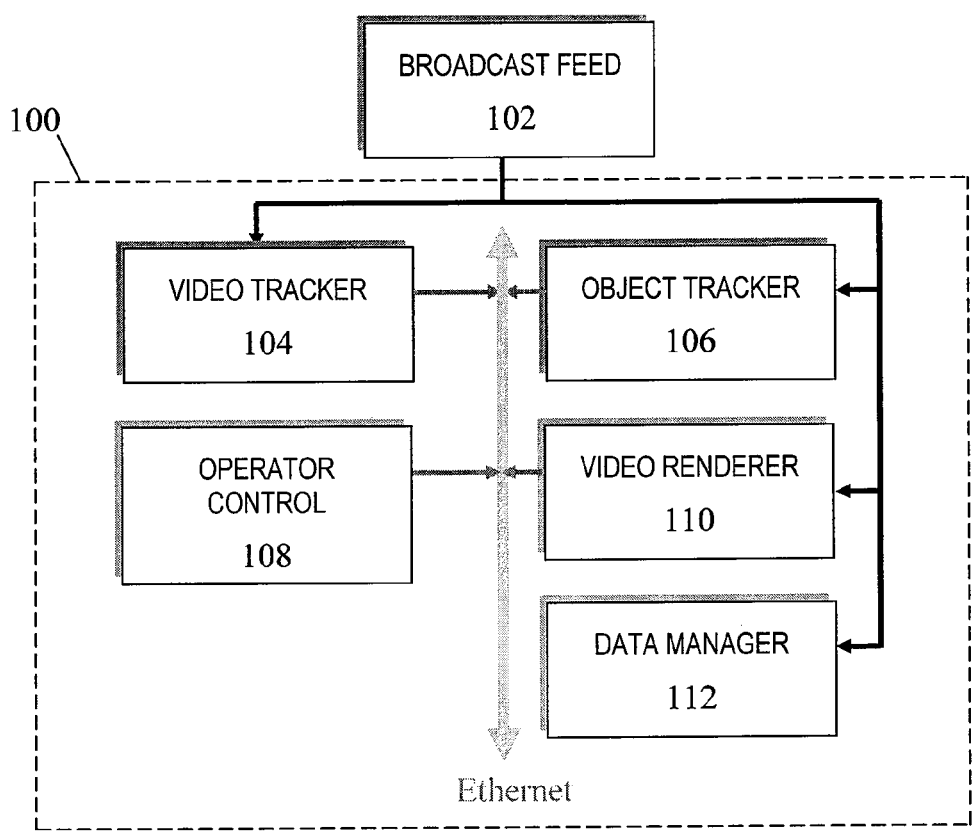
FIG. 1 illustrates a system for deriving information based on perspectives of a 3D scene from a broadcast image of that scene, according to an embodiment.

FIG. 1 is a block diagram of an embodiment of a viewpoint representation system 100 which can be used in coordination with a television broadcast system and broadcast enhancement systems, according to an embodiment. The system can also be used in web and mobile applications involving video. Other embodiments are described relating to these applications. Viewpoint representation system 100 may include video tracker 104, object tracker 106, operator control 108, video renderer 110 and data manager 112. System 100 receives a video broadcast feed 102 from a broadcast production facility. This may be a dedicated feed from a camera covering an event or scene, or an isolated point of view camera, or a program feed which cuts among video from multiple cameras. In some cases, video broadcast feed 102 may also be generated from a sensor configured to generate a sensor model representation of a location point in a 3D scene. A location point of an object in the 3D scene may be on or near the object. The sensor may have a perspective external to the location point.

Video tracker 104 analyzes an incoming video stream for landmarks and produces a representation of the pan, tilt and zoom (PTZ) of the video, according to an embodiment. The PTZ representation may be made with respect to a location point in a scene. This representation may be combined with camera position information to produce a camera model representation. In some cases, camera or sensor model representations may include directional measurements. In other cases, a sensor model representation may include information corresponding to objects or locations in an image or video. Video tracker 104 may update a camera position over time through frame to frame analysis of features in the video, such as a texture analysis method. These techniques are well known and are described in U.S. Pat. Nos. 5,808,695 and 6,529,613. Alternately, video tracker 104 may rely on PTZ sensors on the camera or a combination of sensors and image stabilization. Techniques for doing this are described, for example, in U.S. Pat. No. 6,100,925. The resulting camera model may be sent over a network, such as a wireless or Ethernet connection, to object tracker 106, video renderer 110 and operator control 108. The camera model may be used to obtain information about the scene. In another embodiment, a camera model may be used to establish a mapping between data gathered in screen space of the broadcast video and view point representation.

Object tracker 106 may be configured to receive the sensor or camera information from video tracker 104, according to an embodiment. In some cases, object tracker 106 may also update a camera model representation for a particular frame. In another embodiment, object tracker 106 may be configured to derive a first two dimensional (2D) view point representation of a location point in the 3D scene. The 2D view point representation may be based on a camera or sensor model representation. The camera or sensor model representation may be generated using a sensor having a perspective external to the location point. In some cases, data manager 112 may be configured to receive sensor or camera information and determine a 2D view point representation of a location point in the 3D scene.

For many sporting applications, foreground objects may be distinguished from playing surfaces based on color. Chroma key techniques to handle occluding foreground objects are well known and are described, for example, in U.S. Pat. No. 7,015,978, the contents of which are hereby incorporated by reference. Objects may be found in a chroma key mask by searching for regions not matching a background key color, finding the size of the boundary, and discarding if not having the size corresponding to the player, and find point corresponding to the player's feet. Detection approaches are known in the art, and are described in, for instance, patent application Ser. No. 12/403,857, the contents of which are hereby incorporated by reference. The screen location for the object may be converted to view point representation using the camera model received from video tracker 104. The resulting information may be sent over a network including, but not limited to, a wireless or Ethernet connection to video renderer 110 and operator control 108.

Video renderer 110 may be responsible for generating and mixing graphics into the video feed, according to an embodiment. Video renderer 110 may analyze the input video to find the dominant color of the background if chroma key processing of foreground objects is desired. This is described in detail in, for instance, U.S. Pat. No. 7,015,978, which is hereby incorporated by reference. Video renderer 110 may receive sensor or camera orientation information from video tracker 104. Video renderer 110 may also receive an object location in 2D view point representation from object tracker 106. According to some embodiments, video renderer 110 may be configured to determine a data representation based upon the 2D view point representation. In other embodiments, data manager 112 may be configured to generate a scene measurement in the 3D scene based upon a 2D view point representation. Data manager 112 may also be configured to determine a data representation, including game statistics, based upon the 2D view point representation. Data manager 112 may further be configured to determine a 3D model of a dynamic object based on the sensor model representation. Data manager 112 may additionally determine a data representation based on the 3D model of the dynamic object. In one embodiment, video renderer 110 may be configured to determine a graphical representation. In a further embodiment, video renderer 110 may be configured to display a graphical image within a larger image of the 3D scene based upon a data representation or graphical representation. The unified image may be a broadcast or a view of the 3D scene from a unifying view point. The graphical image may be displayed during a display of the 3D scene. For example, a text box or graphic may be displayed next to a player during a hockey game broadcast on a television monitor. In some cases, video renderer 110 may be used to realistically render artwork into the video scene based on a view point position and/or generated information. Graphic rendering approaches are well known in the art. Additionally, a view point representation sent from object tracker 106 may be used to generate statistics that are inserted as a burn-in graphic. In a typical scenario, mixed output may be sent out for broadcast. In one embodiment, video tracker 104 functionality is performed by object tracker 106. In another embodiment, video tracker 104 functionality is performed by data manager 112. In yet another embodiment, object tracker 106 functionality is performed by data manager 112.

Video renderer 110 may generate a graphical presentation by rendering a graphical insert into a video image in a position corresponding to an object in the video image, according to an embodiment. The graphical insert may appear to track with the object, such as a ring tracking with the position of the player's feed during a sporting event. Part of the graphic may appear to track with an object in the video, such as an arrow pointing to a player where only the point of the arrow tracks the object location. The graphic may appear to track with the background scene of the video and represent the path or trail of an object moving across the background scene. The graphic may represent the 3D trajectory of an object, and appear locked in 3D space as the camera moves. The graphic may appear to be overlaid on the 2D surface of the display screen, and may appear to track with the movements of an object in the video.

In one embodiment, a graphical presentation may be an image of a data representation generated using the sensor model representation associated with a location point on a dynamic object, and the 3D model associated with the dynamic object. It may be a graphic containing text corresponding to the data representation and may be presented in a fixed location overlaying the video, or may overlay the video and track with an object in the video, or may overlay the video and track with the background. Alternately, the graphic may be embedded in the video with or without occlusion processing to avoid covering foreground objects. In another embodiment, a position or size of the graphic integrated or overlaying the video may be determined by the second sensor model and the 3D model associated with the dynamic object.

According to an embodiment, video renderer 110 may generate a graphical presentation including a virtual presentation of a portion of a 3D scene. It may include a virtual presentation from a virtual perspective or view point of the 3D scene. It may include fixed or dynamic images of the background, such as the playing surface of a sporting event. The graphical representation may include representation of foreground objects. A foreground object may be represented by segmenting regions of a video containing the foreground object. A graphical representation may include a fixed or animated representation of the foreground object, representing one or more spatial-temporal attributes of the foreground object: position, pose, shape, orientation, path, trajectory, velocity, etc. The graphical presentation may contain images of data representation generated using a sensor position and a 3D model corresponding to a dynamic object.

In one embodiment, a particular perspective used to generate a graphical presentation may be user-controlled. A user, viewing and manipulating a graphical presentation may change a viewing position or the orientation and size (zoom) of the viewing port, or both. In some cases, operator control 108 may be used to enable a user to manipulate a view point or view port. In another embodiment, a viewing position used to generate a graphical presentation may approximate the physical position of a viewer or group of viewers at a sporting event. This may be implemented using a portable viewing device accessible by the viewer, or may be presented on an animated display mounted in the sports arena or stadium, visible by viewers in a portion of the seating in the venue. In a particular embodiment, a viewing position of a graphical presentation may be determined in part by GPS positional information. Other graphical presentations for object in a 3D scene are described by patent application Ser. No. 12/490,026, which is incorporated by reference.

Operator control 108 may enable a human to monitor and correct the broadcast enhancement process, according to an embodiment. Operator control 108 may provide feedback of the state of video tracker 104 with diagnostics overlaid on a video window. In some cases, operator control 108 may allow monitoring of object tracker 106 data output, with the option to select information from an object of interest. Operator control 108 may also enable the selection of graphics or statistics and the monitoring of results within video renderer 110 or data manager 112. In most cases, video tracker 104, object tracker 106, video renderer 110 and/or data manager 112 may be controlled through a network, such as through wireless or Ethernet communications. In some embodiments, the operator may control graphical presentations that include virtual representations of the 3D scene.

Figure 2A:
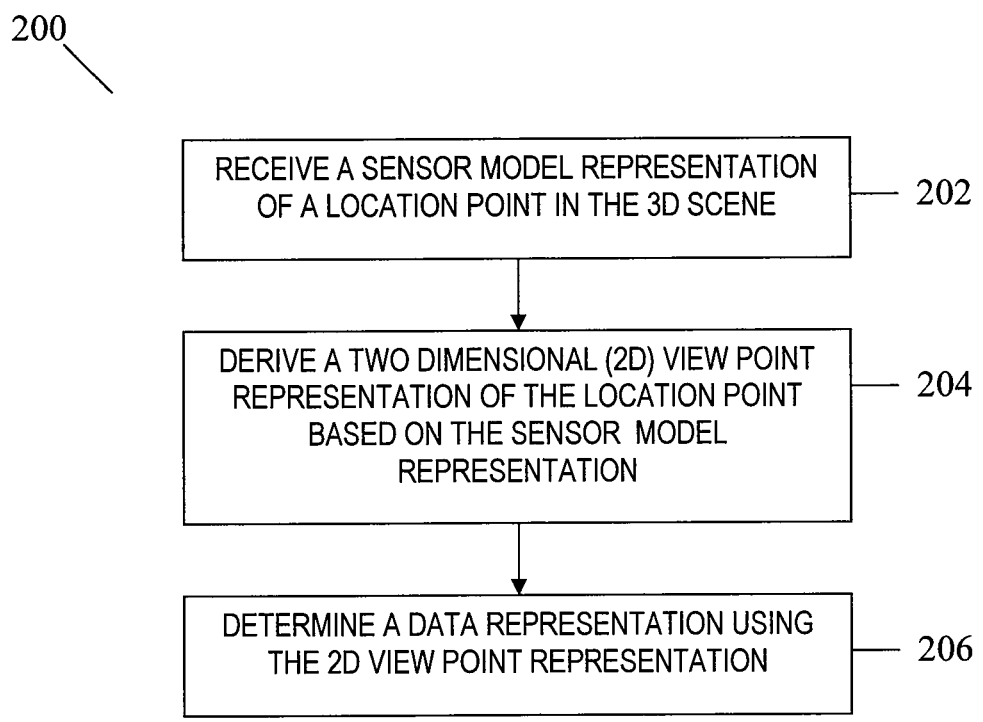
FIG. 2A illustrates a flowchart of a method for deriving information based on perspectives of a 3D scene, according to an embodiment.

FIG. 2A shows an exemplary method 200 for obtaining information based on perspectives of a three-dimensional (3D) scene, according to an embodiment. In step 202, a sensor model representation of a location point in a 3D scene is received. The sensor may have a perspective external to the location point. In some cases, a sensor system may include one or more imaging devices. A sensor system may include a cameras, a pro-sumer high-definition HD camera, a system of cameras or any other devices for obtaining object information. A more sophisticated realization of a sensor representation may involve a computing element analyzing a video from a camera to extract object information. In other cases, a sensor may be a screen on a computing device, tablet, or mobile device. For example, a sensor model representation may be obtained by a user annotating a location of basketball shots on a touch screen of a personal data assistant (PDA). In this case, the information may be converted to a view point representation using a processor in the PDA. In step 204, a two dimensional (2D) view point representation of the location point is derived based on the sensor model representation. In step 206, the 2D view point representation is used to determine a data representation. This data representation may be used to create distance or scene measurements for one or more objects in the 3D associated with the location point. For example, this may include computing a shot distance to the basketball goal. In some cases, data representations may be determined using a horizontal angle measurement and/or a vertical angle measurement. In another example, a graphical representation may include generating a rendering box over a shot position. The box may be overlaid on video of the basketball court. In some cases, a data representation or graphical representation may be output in a useable format. This format may be a display on the PDA, illustrating a table of shot distances for an associated player. In other cases, this may be a display of a basketball court illustrating the location of the shots overlaid on the floor graphic.

In some cases, a sensor model representation may be an image coordinate or a portion of the image or the full image of a camera field or frame. A sensor model representation may be a screen coordinate or portion of the screen. It may be a physical position or physical region on a camera's CCD array. It may also be a similar data representation or measurement. In a further embodiment, a sensor model representation may include measurements from non-visual object sensors. In other cases, a sensor model representation may include data from wireless sensors, global positioning system (GPS) sensors or radio frequency identification (RFID) sensors. In some cases, sensor model representation may be generated using a mobile device, such as a smart phone or electronic tablet. The sensor model representation may be generated by any other sensors to record signals and information about an athletic event and to detect, observe or track objects.

Figure 4:
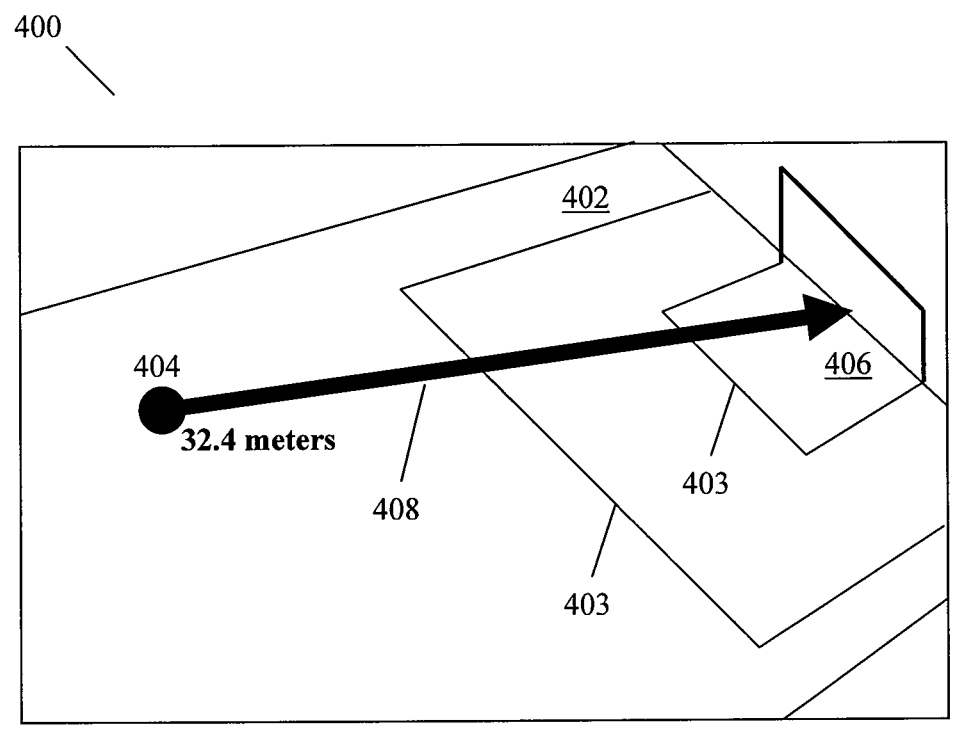
FIG. 4 illustrates a sample application for measuring and displaying distance as part of a broadcast enhancement.

FIG. 4 shows an example view port 400 that displays a portion of a field 402 having markings 403 for soccer. A view port may be a display device. A view port may also be a display window shown on a display device. Using markings, such as markings 403, video tracker 104 in broadcast system 100 may extract a camera model representing the camera orientation relative to the field 402. Suppose a free kick position 404 in soccer is identified in view port 400 by a user through operator control 108. This screen location may be converted to view point representation in object tracker 106. Similarly, the position of the goal 406 may be stored in a view point representation as part of a pre-game setup procedure. The distance between the free kick location 404 and goal 406 may be derived from view port data. Video renderer 110 may insert the distance value into the video as a graphic 408 (shown as the bold arrow and distance measurement), extending from the kick point 404 to the goal 406. This example demonstrates both the view port rendering aspect and data generation aspect of embodiments of the invention. In an embodiment of the invention, this application may be built into a telestrator platform with an interface that may be used by a broadcast announcer.

Figure 2B:
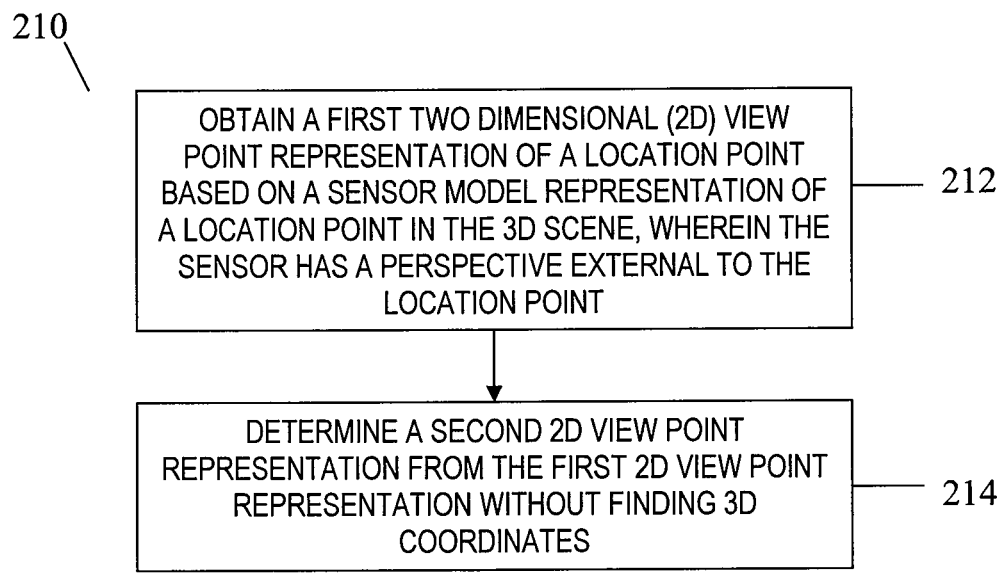
FIG. 2B illustrates a flowchart of a method for unifying information from different perspectives in a 3D scene, according to an embodiment.

FIG. 2B illustrates an exemplary method 210 for unifying information of different perspectives in a 3D scene, according to an embodiment. In step 212, a 2D view point representation of a location point based on a sensor model representation of a location point in the 3D scene may be obtained. The sensor may have a perspective external to the location point. In step 214, the 2D view point representation may be used to determine a second 2D view point representation. This may be performed without finding 3D coordinates. This may reduce the extra overhead involved in maintaining 3D coordinates. In an embodiment, a data representation may be determined by using a first 2D view point representation to determine a second 2D view point from a second sensor having a second perspective external to the location point. In another embodiment, a 2D view point representation may be used to determine a unifying 2D view point for unifying information from multiple view points. In most cases, the unifying 2D view point may be displayed.

Figure 3:
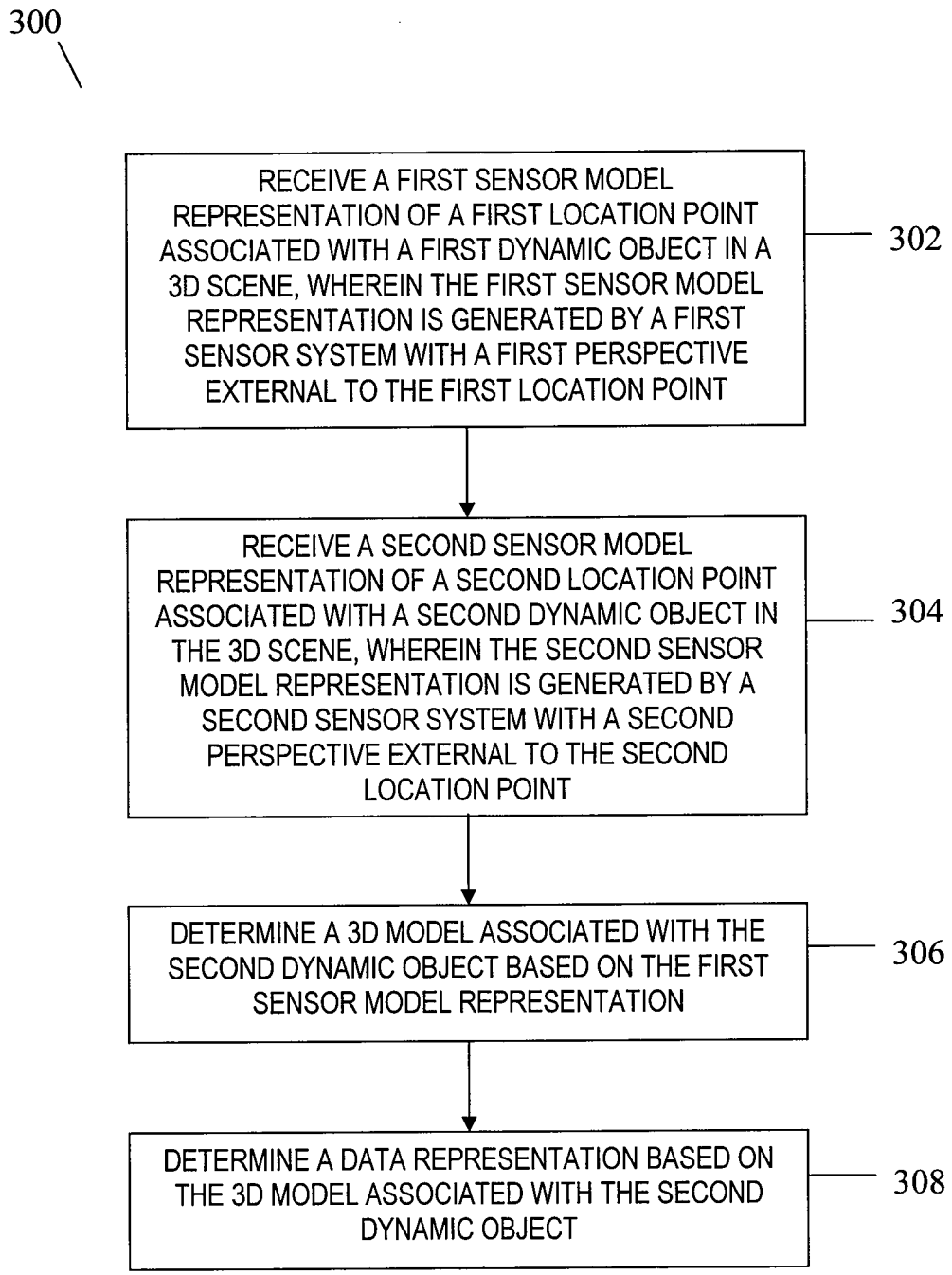
FIG. 3 illustrates a flowchart of a method for deriving a data representation using a 3D model representing a dynamic object in the scene, according to an embodiment.

FIG. 3 is a flow chart of an exemplary method 300 for determining a 3D model associated with a dynamic object, and using the 3D model to generate a graphical representation associated with the dynamic object. In step 312, a first sensor model representation is received corresponding to first location point associated with a first dynamic object. The first sensor model representation is generated using a first sensor system with a first perspective external to the first location point. In step 314, a second sensor model representation is received corresponding to a second location point associated with a second dynamic object. The second sensor model representation may be generated using a second sensor system with a second perspective external to the second location point. In step 316, a 3D model associated with the second dynamic object is determined based on the first sensor model representation. In step 318, a data representation may be generated using the 3D model associated with the second dynamic object. In one embodiment, the second sensor model representation may be also used to generate the data representation. In another embodiment, the second sensor model representation may be also used to determine the 3D model associated with the second dynamic object. In further embodiments, the data presentation may be a graphical representation, which may correspond to a portion of the 3D scene. The graphical presentation may have a third view point or perspective external to the second location point associated with the second dynamic object. In some embodiments, steps 312-316 may be performed by data manager 112. Step 318 may be performed by video renderer 110. In other cases, steps 312-318 may be performed by video renderer 110.

In one embodiment, a first sensor system with a first perspective of a 3D scene and a second sensor system with a second perspective of the 3D scene may be the same sensor system with the same perspective of the 3D scene. In another embodiment, the third perspective for the graphical representation may be the same as the first perspective of the first sensor system or, the third perspective for the graphical representation may be the same as the second perspective of the second sensor system. In yet another embodiment, a sensor in the first sensor system may be a camera; or a sensor in the second sensor system may be a camera. In a further embodiment, the first dynamic object and the second dynamic object may be the same dynamic object.

A dynamic object may move during the period of observation, including changes in position, orientation, shape, or pose over time. A dynamic object may include athletes participating in the sporting contest, referee supervising the sporting contest, equipment used by the athlete (safety gear, skates, gloves, hockey sticks, etc.), the scoring object itself (ball or puck), or other sports related objects not mounted in a fixed location relative to the playing surface. The location point associated with a dynamic object may be a reference point on the surface of the dynamic object, such as on at the head or feet of an athlete. The location point associated with a dynamic object may be a reference point within the interior of the volume of the dynamic object. The location point associated with a dynamic object may be a point near the object that is connected to the physical location of the object. For example, the location point associated with a dynamic may be located on the playing surface below the dynamic object, when the dynamic object is airborne.

A 3D model associated with a dynamic object may be comprised of one or more virtual surfaces, which may include: a plane, a planar surface with a fixed boundary or edge, a sphere, a cylinder, a pyramid, a cube, a tetrahedral, a curved surface, or any appropriate shape. This may include a complex surface formulated by triangle regions such as used in 3D modeling of animated objects in the graphics and gaming industry. In one embodiment, the size matches the expected size of the object. In another embodiment, the size may be much smaller or larger than the object modeled. The 3D model may include the positional relationship between the virtual surface in the 3D model and the location point associated with the dynamic object, which may include the size of the offset or the direction of the offset. In one embodiment, the offset may described the vector between the location point and the 3D centroid of a virtual surface encompassing a volume, such as a sphere or cylinder. In another embodiment, the offset may describe the vector between the location point and a position on a virtual surface. The 3D model may include the orientation of a virtual surface, such as the direction of the plane normal in the case that the virtual surface is a plane, or has one or more planar surfaces such as a cylinder. In further embodiments, the 3D model may be determined by more than one sensor model representation, which may be useful to vary the size and orientation of a virtual surface in the 3D model.

A three-dimensional (3D) model associated with a dynamic object may describe a spatial attribute of the object, such as shape, pose, orientation, trajectory, path, rotation, etc. In one embodiment, it may be used to model a hockey goalie in a protective stance. For example, one representation for the hockey goalie may be a plane perpendicular to the ice with an orientation related to the shooter, and position related to the goalie's position on the playing surface. In another embodiment, it may be used to describe the trajectory of an object such as basketball shot, soccer shot or hockey shot. The orientation of the plane may be set by the player taking the shot, whereas the plane itself describes the trajectory of the scoring object that is shot. In a particular embodiment, the 3D model may be used to determine the 3D trajectory of an object, such as a ball or puck, based on sensor model representations from two or more sensors with different perspectives of the 3D scene. This may be applicable in situations where the sensors are not temporally synchronized, such as gathering position information about a fast moving hockey puck using multiple cameras that are not field or frame synchronized by a gen-lock signal.

It is useful to have a unifying scheme for representing object information. For example, in the surveying field, a theodolite is a traditional instrument used to gathering information about a 3D scene. It measures the direction of landmarks in terms of horizontal and vertical angles from a fixed position. This model may be utilized as a means of representing scene information derived from cameras, with the potential of combining external sources of data. According to some embodiments, scene information may be determined using a 2D view point representation includes using a horizontal angle measurement and a vertical angle measurement.

Figure 5:
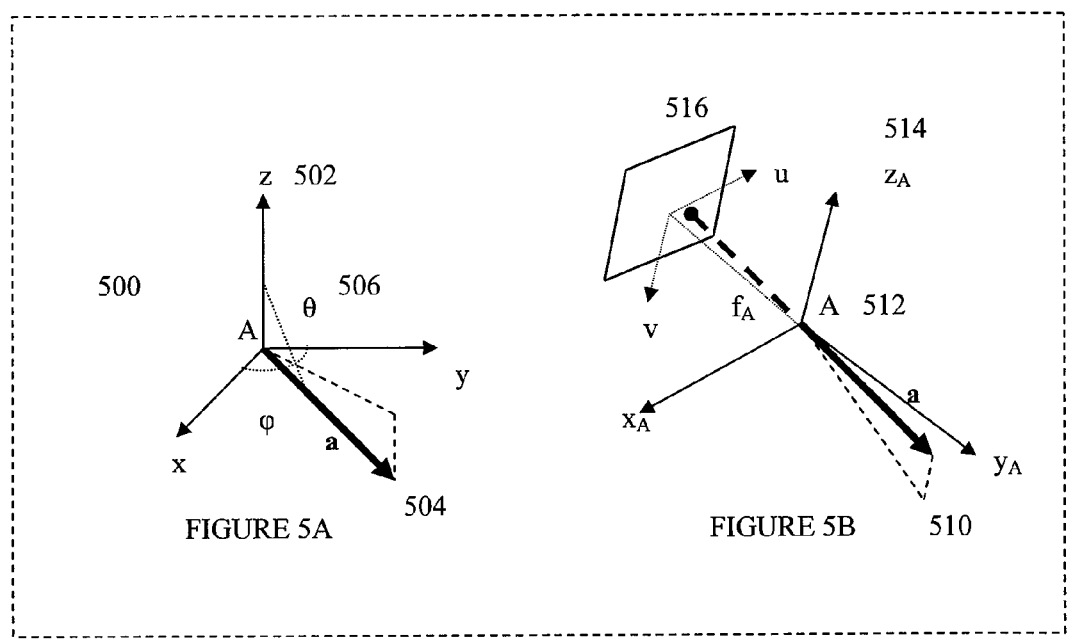
FIGS. 5A-B illustrate a view point representation with respect to dual angle coordinates and imaging on a camera sensor, according to embodiments.

A view point may include a physical point in the 3D world from which the direction of relative positions in the scene is observed. According to an embodiment, FIG. 5A illustrates view point A 500 with a position $(A_x, A_y, A_z)$ in Cartesian coordinates 502. The ray "a" points toward observed object or landmark 504 in the scene. Like the theodolite, this direction may be represented in 2D angle notation as horizontal and vertical angles $(\phi_a, \theta_a)$ 506. It may be alternatively represented in terms of Cartesian space as a normalized direction vector â. If the direction of the y-axis is defined as $(\phi_a, \theta_a)=(0, 0)$, the normalized direction vector â may be derived in terms of the angles $(\phi_a, \theta_a)$ where $$\hat{a} = \begin{bmatrix} x_a \\ y_a \\ z_a \end{bmatrix} = \begin{bmatrix} \sin\varphi_a \cos\theta_a \\ \cos\varphi_a \cos\theta_a \\ \sin\theta_a \end{bmatrix} \quad (1)$$

By definition, the normalized vector â has a scalar dot product $â^T â=1$. Due to the normalization process, it does not maintain magnitude information and its elements $(x_a, y_a, z_a)$ do not retain physical units of length. Although this representation contains three elements, it does not constitute 3D coordinate information since it does not retain distance (range) information. For example, an observation â made of point P from view point A is not sufficient to constitute the 3D coordinate of point P.

For at least the above reason, this approach may be considered distinct from approaches that typically represent objects with 3D coordinates. Similarly, the view point representation may be considered as distinct from approaches that typically provide for mapping observed points onto a sphere in physical 3D space.

The 2D angle notation ($\phi_a$, $\theta_a$) may be derived from the normalized direction vector $\hat{a}$, $$\varphi_a = \tan^{-1}\frac{x_a}{y_a} \quad (2)$$

$$\theta_a = \tan^{-1}\frac{z_a}{\sqrt{x_a^2 + y_a^2}}$$

It is possible to derive a direct mapping between 2D angle representation for two view points A and B. Suppose the relationship between normalized observation vectors $\hat{a}$ and $\hat{b}$ may be defined as a 3×3 translation matrix T, which will be defined later. ($\phi_a$, $\theta_a$) in terms of ($\phi_b$, $\theta_b$) may be found and the elements of the translation matrix using (1) and (2), $$\begin{bmatrix} x_a \\ y_a \\ z_a \end{bmatrix} = \hat{a} = T\hat{b} = \begin{bmatrix} t_{11} & t_{12} & t_{13} \\ t_{21} & t_{22} & t_{23} \\ t_{31} & t_{32} & t_{33} \end{bmatrix}\begin{bmatrix} x_b \\ y_b \\ z_b \end{bmatrix} \quad (3)$$

$$\varphi_a = \tan^{-1}\frac{t_{11}\sin\varphi_b + t_{12}\cos\varphi_b + t_{13}\tan\theta_b}{t_{21}\sin\varphi_b + t_{22}\cos\varphi_b + t_{23}\tan\theta_b}$$

$$\theta_a = \tan^{-1}\frac{t_{31}\sin\varphi_b + t_{32}\cos\varphi_b + t_{33}\tan\theta_b}{\sqrt{(t_{11}\sin\varphi_b + t_{12}\cos\varphi_b + t_{13}\tan\theta_b)^2 + (t_{21}\sin\varphi_b + t_{22}\cos\varphi_b + t_{23}\tan\theta_b)^2}}$$

The ratios were simplified by dividing the top and bottom terms by cos $\theta_b$.

One advantage of 2D view point representation over 3D is that less data is needed for storage. This may be a concern on portable platforms (PDA, cell phone, etc.) where memory and computational power is limited. The concern about available resources increases with the level of detail in data being stored and retrieved. Limited bandwidth in communication to the portable devices may also be an issue.

One method for making observations, according to an embodiment, is using a camera. FIG. 5B illustrates the problem of measuring observation vector $\hat{a}$ 510 with a tripod mounted camera located at observation point A 512. It may be convenient to view the pan ($\phi_A$), tilt ($\theta_A$), and roll ($\gamma_A$) of the camera on the tripod as rotation of the coordinate space around the z, x, and y axis. As seen in FIG. 5B, the axis 514 ($x_A$, $y_A$, $z_A$) of camera located at A 512 is rotated although the observed vector $\hat{a}$ is fixed in position 510. The camera itself may be modeled as pin-hole located at point A 512 with a planar sensor 516 the focal length ($f_A$) distance behind point A 512. In an embodiment, scene information may be determined using a focal point distance between location point A 512 and sensor plane 516. Sensor plane 516 may be located on an opposite side of location point A 512 from observation vector $\hat{a}$ 510, as shown in FIG. 5B. The optical axis of the camera may align with $y_A$ and align with the center of sensor (denoted by a parallelogram). The horizontal ($u_a$) and vertical position ($v_a$) on the camera's sensor maps to the direction vector $\hat{a}$, which may be derived from ($u_a$, $f_A$, $v_a$) as follows $$\hat{a} = \begin{bmatrix} x_a \\ y_a \\ z_a \end{bmatrix} = R(\varphi_A)R(\theta_A)R(\gamma_A)\frac{1}{\sqrt{u_a^2 + f_A^2 + v_a^2}}\begin{bmatrix} u_a \\ f_A \\ v_a \end{bmatrix} \quad (4)$$

The factor $\sqrt{u_a^2 + f_A^2 + v_a^2}$ is a normalization constant that ensures the resulting vector has a dot product $\hat{a}^T\hat{a}=1$. R($\phi$), R($\theta$) and R($\gamma$) are 3×3 rotation matrices for pan ($\phi_A$), tilt ($\theta_A$), and roll ($\gamma_A$), that rotate the coordinate space around the z, x and y axis. They may be defined as follows $$R(\gamma_A)\begin{bmatrix} \cos\gamma_A & 0 & \sin\gamma_A \\ 0 & 1 & 0 \\ -\sin\gamma_A & 0 & \cos\gamma_A \end{bmatrix} \quad (5)$$

$$R(\varphi_A)\begin{bmatrix} \cos\varphi_A & -\sin\varphi_A & 0 \\ \sin\varphi_A & \cos\varphi_A & 0 \\ 0 & 0 & 1 \end{bmatrix}$$

$$R(\theta_A)\begin{bmatrix} 1 & 0 & 0 \\ 0 & \cos\theta_A & -\sin\theta_A \\ 0 & \sin\theta_A & \cos\theta_A \end{bmatrix}$$

Note, (4) may be used to convert camera screen coordinates to a view point representation in the example broadcast application given in FIG. 3. Also, alternate schemes for representing the rotation and coordinate axes are possible. For example, coordinates corresponding to camera often represent z axis outward from the camera and y axis pointing in a downward direction. The horizontal ($u_a$) and vertical position ($v_a$) on the camera's sensor may be expressed in terms of direction vector $\hat{a}$ using the following equations $$u_a = f_A\frac{x_A}{y_A} = f_A\frac{r_{11}x_a + r_{12}y_a + r_{13}z_a}{r_{21}x_a + r_{22}y_a + r_{23}z_a} \quad (6)$$

$$v_a = f_A\frac{z_A}{y_A} = f_A\frac{r_{31}x_a + r_{32}y_a + r_{33}z_a}{r_{21}x_a + r_{22}y_a + r_{23}z_a}$$

$$\begin{bmatrix} x_A \\ y_A \\ z_A \end{bmatrix} = \hat{a}_A = \begin{bmatrix} r_{11} & r_{12} & r_{13} \\ r_{21} & r_{22} & r_{23} \\ r_{31} & r_{32} & r_{33} \end{bmatrix}\begin{bmatrix} x_a \\ y_a \\ z_a \end{bmatrix} = R^{-1}(\gamma_A)R^{-1}(\theta_A)R^{-1}(\varphi_A)\hat{a}$$

$\hat{a}_A$ is the direction vector $\hat{a}$ expressed in rotated camera coordinates ($x_A$, $y_A$, $z_A$). The 3×3 matrix containing terms $r_{11}$ through $r_{33}$ include the combination of the inverse rotation matrices for roll, tilt and pan are $R^{-1}(\gamma_A)$, $R^{-1}(\theta_A)$ and $R^{-1}(\phi_A)$. In practice, it is advantageous to multiply the matrices together in advance before performing a series of mappings from camera to direction vector space.

Another advantage of view point representation is that range data is not needed to store the location of objects in the scene. Using (4), (5) and (6), information may be converted back and forth between the camera and the unifying representation, without ever knowing the distance to the objects represented. This is particularly useful in situations where achieving accurate 3D scene geometry is difficult. Screen space representation for data may be employed for these situations, but this would require storing camera data structure along with data points for smooth data conversion.

View point representation may also closely match the operation of a tripod mounted camera. Screen space representation has difficulty connecting positions in the view port with those outside, particularly when the physical point in real-space coincides with the imaging plane of the camera. Furthermore, there are situations where full camera calibration is not feasible, so formulations that are not sensitive to the inaccuracies of the model are desirable.

Similar to the 2D angle representation, a direct map from a camera at view point B to a camera at view point A may be performed, according to an embodiment. The translation from B to A may be handled using a 3×3 matrix T defined below. The camera plane to camera plane homographic mapping may be derived by formulating a 3×3 matrix M using (4) and (6), $$\begin{bmatrix} m_{11} & m_{12} & m_{13} \\ m_{21} & m_{22} & m_{23} \\ m_{31} & m_{32} & m_{33} \end{bmatrix} = M = R^{-1}(\gamma_A)R^{-1}(\theta_A)R^{-1}(\varphi_A)TR(\varphi_B)R(\theta_B)R(\gamma_B) \quad (7)$$

$$u_a = f_A \frac{m_{11}u_b + m_{12}f_B + m_{13}v_b}{m_{21}u_b + m_{22}f_B + m_{23}v_b}$$

$$v_a = f_A \frac{m_{31}u_b + m_{32}f_B + m_{33}v_b}{m_{21}u_b + m_{22}f_B + m_{23}v_b}$$

The terms $m_{11}$ through $m_{33}$ constitute a 3×3 matrix formed by the combination of the inverse rotation, translation, and forward rotation matrices. Note that the normalization constant $\sqrt{u_a^2+f_A^2+v_a^2}$ in (4) divides out in the computation for $u_a$ and $v_a$.

The formulations above may be combined to support direct mappings between camera and 2D angle coordinate spaces, in an embodiment. As previously mentioned, consider the problem of mapping from view point B to view point A utilizing the translation matrix T. A similar approach may be followed to derive 2D angle coordinates ($\phi_a$, $\theta_a$) at observation point A in terms of camera measurements ($u_b$, $v_b$) at observation point B. A direct mapping may be performed by formulating a 3×3 matrix M from (4) and substituting in (2), $$\begin{bmatrix} m_{11} & m_{12} & m_{13} \\ m_{21} & m_{22} & m_{23} \\ m_{31} & m_{32} & m_{33} \end{bmatrix} = M = TR(\varphi_B)R(\theta_B)R(\gamma_B) \quad (8)$$

$$\varphi_a = \tan^{-1} \frac{m_{11}u_b + m_{12}f_B + m_{13}v_b}{m_{21}u_b + m_{22}f_B + m_{23}v_b}$$

$$\theta_a = \tan^{-1} \frac{m_{31}u_b + m_{32}f_B + m_{33}v_b}{\sqrt{(m_{11}u_b + m_{12}f_B + m_{13}v_b)^2 + (m_{21}u_b + m_{22}f_B + m_{23}v_b)^2}}$$

Similar to the homographic example, the terms $m_{11}$ through $m_{33}$ constitute a 3×3 matrix formed by the combination of the translation and forward rotation matrices. The key difference is that the 2D angle coordinate transformation does not require reverse rotational matrices. As before, the normalization constant $\sqrt{u_b^2+f_B^2+v_b^2}$ need not be computed since it divides out in the computation for ($\phi_a$, $\theta_a$). The 2D angle coordinate system to camera may be found from (1) and (6) to have the following form, $$\begin{bmatrix} m_{11} & m_{12} & m_{13} \\ m_{21} & m_{22} & m_{23} \\ m_{31} & m_{32} & m_{33} \end{bmatrix} = M = R^{-1}(\gamma_A)R^{-1}(\theta_A)R^{-1}(\varphi_A)T \quad (9)$$

$$u_a = f_A \frac{m_{11}\sin\varphi_b + m_{12}\cos\varphi_b + m_{13}\tan\theta_b}{m_{21}\sin\varphi_b + m_{22}\cos\varphi_b + m_{23}\tan\theta_b}$$

$$v_a = f_A \frac{m_{31}\sin\varphi_b + m_{32}\cos\varphi_b + m_{33}\tan\theta_b}{m_{21}\sin\varphi_b + m_{22}\cos\varphi_b + m_{23}\tan\theta_b}$$

Again, terms $m_{11}$ through $m_{33}$ constitute a 3×3 matrix now formed by the combination of the inverse rotation and translation matrices. Note, the top and bottom quantities of each ratio were divided by $\cos\theta_b$ to simplify the calculations.

A generalized mapping of 2D observations between points of view of the 3D world may be defined, according to an embodiment. This may be achieved by using 3D information in the formulation of the mapping, but 2D information in the application of the mapping. Consider FIG. 6 where point P 630 is observed from real-world positions A 620 and B 622. Point P 630 lies on a surface with a normal vector $\hat{n}$ 626, and normalize vectors $\hat{a}$ 624 and $\hat{b}$ 628 directed toward P represent observations of P from A 620 and B 622. Although $\hat{a}$ and $\hat{b}$ may contain the three components of Cartesian coordinates, the vectors do not retain physical units of length so that only 2D directional information is truly represented. Specifically, given the location of the reference point B 622, vector $\overline{BP}$ 628 could uniquely define coordinates of point P 630 whereas unit vector $\hat{b}$ may not.

Figure 6:
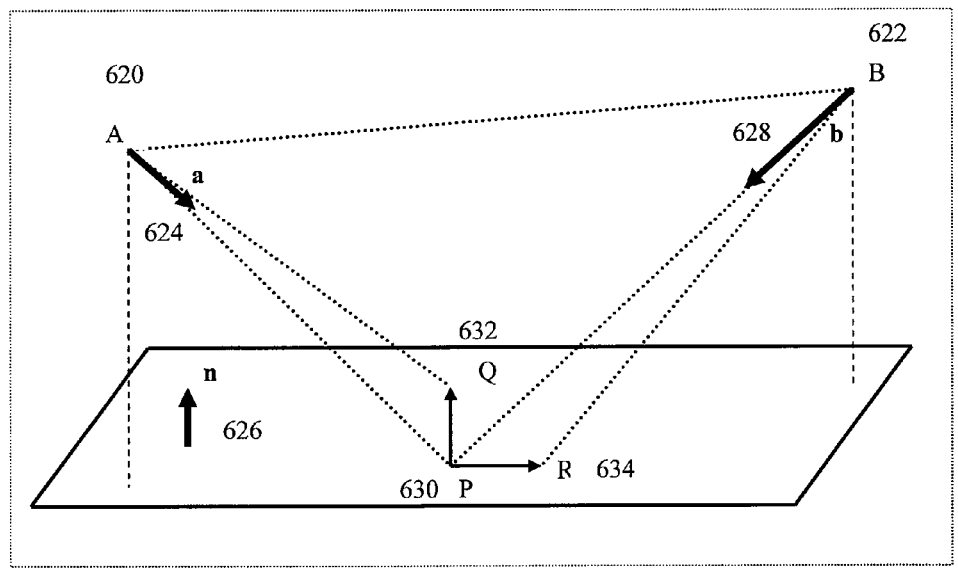
FIG. 6 illustrates mapping between view points using an arbitrary fixed plane, according to an embodiment.

According to an embodiment, the relationship between points A 620, B 622 and P 630 in FIG. 6 may be represented by vector arithmetic, $\overline{AP}=\overline{AB}+\overline{BP}$. Vectors $\overline{AP}$ 624 and $\overline{BP}$ 628 define the location of P relative to A and B, and vector $\overline{AB}$ denotes the translation between the observation points A 620 and B 622. Suppose $\overline{AB}$ is multiplied by a scalar $k=1=(\hat{n}^T\overline{BP})/(\hat{n}^T\overline{BP})$ for the case $(\hat{n}^T\overline{BP})\neq 0$. This may be rewritten as $\overline{AP}=[\overline{AB}\hat{n}^T/(\hat{n}^T\overline{BP})+I]\overline{BP}=T\overline{BP}$, where I is the identity matrix and T is a translation matrix from observation A to B. Since the direction vector $\hat{b}=\overline{BP}/\|\overline{BP}\|$, this becomes $\overline{AP}=T\hat{b}\|\overline{BP}\|$. The magnitude of $\overline{AP}$ may be found from this equation by $\|\overline{AP}\|=(\overline{AP}^T\overline{AP})^{1/2}=\|\overline{BP}\|(\hat{b}^T T^T T \hat{b})^{1/2}$. Since the direction vector $\hat{a}=\overline{AP}/\|\overline{AP}\|$, a direct mapping between the output and input direction vectors $\hat{a}$ and $\hat{b}$ may be achieved, $$\hat{a} = \frac{T\hat{b}}{\sqrt{\hat{b}^T T^T T \hat{b}}} \quad (10)$$

The remaining concern with (10) is that the translation matrix T still depends on the observed point through vector $\overline{BP}$ 628. It is desirable to have a direct mapping to facilitate the conversion of multiple points between view point representations. If $(\hat{n}^T\overline{BP})$ is a constant independent of P 630, then the surface described in the FIG. 6 is a plane with a normal vector $\hat{n}$ 626. This may be rewritten $(\hat{n}^T\overline{BP})=(\hat{n}^T S)-(\hat{n}^T B)$, where $(\hat{n}^T B)$ and $(\hat{n}^T S)$ represent the distance view point B 622 and plane surface S are from the origin along the planes normal. Thus, the translation matrix becomes $$T=[\overline{AB}\hat{n}^T/(\hat{n}^T S-\hat{n}^T B)+I] \quad (11)$$

Note, this matrix now contains only information independent of the 3D point being observed. Consequently, the mapping in (10) from direction vector $\hat{b}$ to direction vector $\hat{a}$ may be achieved without directly resorting to 3D object position information. Also note, this formulation contains the normal 626 of the plane used for translating between view points. Consequently, this allows for a broader range of applications than locating information on a single plane such as the ground plane. An example would include a plane corresponding to a hockey goal. It may be less complicated to compute (11) in a two step method. For example, find $\hat{a}_1=T\hat{b}$ before computing $\hat{a}=\hat{a}_1/\|\hat{a}_1\|$. As discussed earlier, the normalization may not need to be computed when converting to 2D angle and camera representations.

A point that is offset from an observed point by a fixed vector in real space may be mapped, according to an embodiment. A basic premise of this technique is that it may be useful to have some level of 3D understanding of the object under consideration. For example, it may be helpful to know the model of the expected location of the head of a player 6 feet upward from the detected position of the feet. This could aid an algorithm searching for a 6 foot object or a graphics effect point to the head of a person.

Point P 630 and Q 632 of FIG. 6 are observed from points B 622 and A 620, respectively. The vector $\overline{PQ}$ denotes the fixed offset from point P to point Q in real space. For the above example of tracking a person, the corresponding vector $\overline{PQ}$ would be 6 feet in length directed upward. The vector arithmetic equation would become, $\overline{AQ}=\overline{AB}+\overline{BP}+\overline{PQ}$. If ($\overline{AB}+\overline{PQ}$) are grouped together, a mapping of form (5) may be found, where the translation matrix T now becomes, $$T=[(\overline{AB}+\overline{PQ})\hat{n}^T/(\hat{n}^TS-\hat{n}^TB)+I]. \qquad (12)$$

Although the vector offset contains real 3D information related to an object, it may not reveal specific 3D coordinate information for the object. A vector offset has to be combined with a fixed coordinate (such as the location of an observation point A or B) to constitute a 3D coordinate. Note, the preferred realization would be to observe points P and Q from the same observation position. Hence A=B and vector $\overline{AB}=0$.

An additional advantage of view point representation is convenient feedback of information needed for an image processing operation. In the above example of finding the head of a player, (12) enables several points to be processed after the matrix T is pre-computed. This is helpful from a computational standpoint (portable platforms may be limited), but it may aid conceptually in that a module designed to find the heads may be isolated in the software from the handling of 3D geometry.

A real-world distance between two points on an arbitrary pre-defined fixed plane directly from view point observations may be computed, according to an embodiment. There are several potential applications for this technique. For example, the physical distance between two objects on the ground plane may be determined. Not only is this a useful statistic for tracking athletes, but it is helpful for tracking algorithms to associated multiple tracks between time intervals.

In another example, motion statistics may be computed from physical distances for object tracked over time. It is helpful for tracking algorithms to clamp the permitted displacements of tracks between measurement time intervals. In a further example, the distance between objects and physical landmarks in the scene may be found. For instance, the distance between a free kick position and the soccer goal may be found, as discussed in the sample broadcast enhancement in FIG. 4.

In FIG. 6, points P 630 and R 634 are observed from view point B 622, with measurements $\hat{b}_P$ and $\hat{b}_R$ 628. Vector $\overline{PR}$ may lie on the surface plane with normal vector $\hat{n}$ 626. Using the fact $\|\overline{BP}\|=(\hat{n}^T\overline{BP})/(\hat{n}^T\hat{b}_P)$ and $\|\overline{BR}\|=(\hat{n}^T\overline{BR})/(\hat{n}^T\hat{b}_R)$, the vector equation for $\overline{PR}=\overline{BR}-\overline{BP}=\hat{b}_R\|\overline{BR}\|-\hat{b}_P\|\overline{BP}\|$. The vector becomes $\overline{PR}=(\hat{n}^TS-\hat{n}^TB)[\hat{b}_R/(\hat{n}^T\hat{b}_P)-\hat{b}_P/(\hat{n}^T\hat{b}_P)]$. The associated magnitude may be expressed as $$\|\overline{PR}\|=|\hat{n}^TS-\hat{n}^TB|\sqrt{\left[\frac{\hat{b}_R}{n^T\hat{b}_R}-\frac{\hat{b}_P}{n^T\hat{b}_P}\right]^T\left[\frac{\hat{b}_R}{n^T\hat{b}_R}-\frac{\hat{b}_P}{n^T\hat{b}_P}\right]} \qquad (13)$$

The square-root term in (13) is a scalar formulated from unity vectors and thus does not preserve 3D magnitude or directional information. The first is the normal distance from the view point B 622 to the surface of the plane, and this may be pre-computed since it does not contain 3D information specific to the observed points P 630 and R 634. This approach may be used in conjunction with the view point to view point mapping, allowing the source of the observation used to derive the distance to come from multiple view points.

Although the vector $\overline{PR}$ contains both directional and magnitude information, it does not constitute finding 3D world coordinates of an object. The relative position of points R 634 with respect to P 630 in world dimension may be found without explicitly knowing either P or R to reference world coordinates. The actual relative position between objects may be useful during video processing.

An advantage of embodiments of this invention is that 3D measurements may be derived without full 3D world coordinates and camera information. There are applications on portable platforms where computational power is limited and restricting the necessary calculations is desirable. For example, the kick distance application described in FIG. 4 may be performed by a user click on a PDA device. In this case, elements of (13) could be pre-computed to enable quick response with each data entry. In some embodiments, data manager 112 may be configured to translate measurements of a first 2D view point representation into measurements of a second 2D view point representation.

Figure 7:
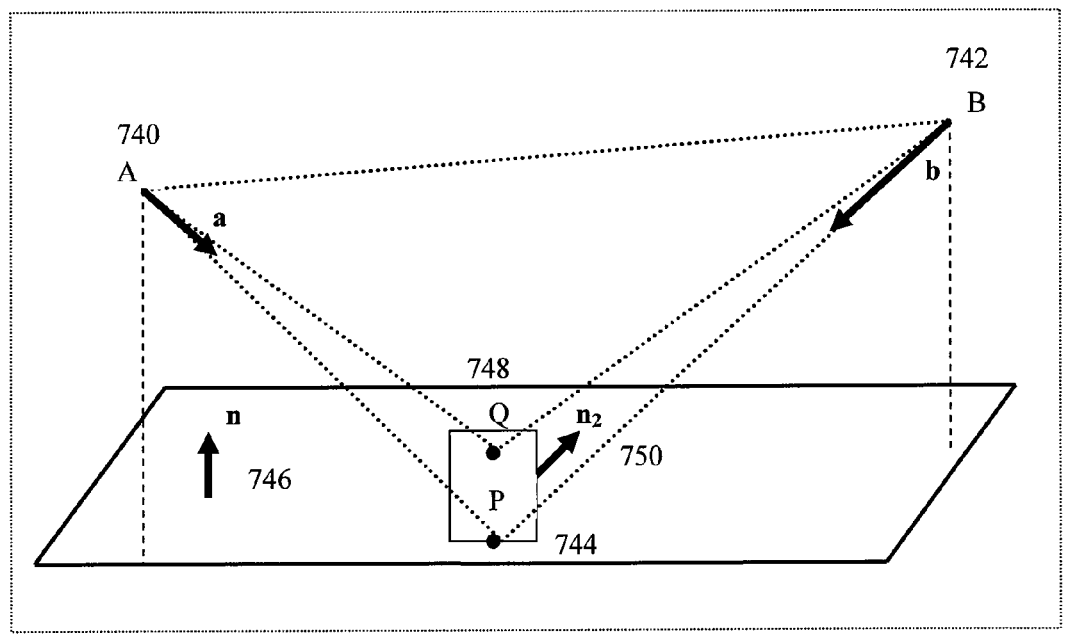
FIG. 7 illustrates mapping between view points for an object represented by a shifting plane, according to an embodiment.

A dynamic object may be modeled in three dimensions by a secondary plane with a position defined by an observed location point on a primary plane, according to an embodiment. FIG. 7 illustrates a case where point P 744 resides on a plane with normal $\hat{n}$ 746 and point Q 748 resides on a plane with normal $\hat{n}_2$ 750. The $\hat{n}_2$ plane also contains point P 744, thereby defining the offset of its position in real space. Defining the mapping of point Q 748 seen in view point B 742 to A 740, reflecting off of a plane with normal $\hat{n}_2$ 750, may be a problem. The translation matrix from view point B 742 to A 740 may be derived from (11), $T=[\overline{AB}\hat{n}_2^T/\hat{n}_2^T(\overline{BP})+I]$. However, the problem here is $\hat{n}_2^T\overline{BP}$ is not a constant because the $\hat{n}_2$ plane moves with P 744. The vector $\overline{BP}$ may be reformulated in terms of view point B 742 observation $\hat{b}_P$, $\overline{BP}=\hat{b}_P\|\overline{BP}\|=\hat{b}_P(\hat{n}^T\overline{BP}/\hat{n}^T\hat{b}_P)=\hat{b}_P(\hat{n}^TS-\hat{n}^TB)/\hat{n}^T\hat{b}_P$. Thus, the translation matrix for the dual plane solution becomes, $$T=[\overline{AB}\hat{n}_2^T/((\hat{n}^TS-\hat{n}^TB)(\hat{n}_2^T\hat{b}_P/\hat{n}^T\hat{b}_P))+I] \qquad (14)$$

Recall that $\hat{n}^TS$ represent the distance the $\hat{n}$ plane is from the origin along the normal $\hat{n}$. A core difference between (14) and previous translation matrices are that this formulation contains unity vector information. However, since it is multiplied by the plane's normal vector, the scalar formulated does not preserve 3D magnitude or directional information. In an embodiment, data manager 112 may be configured to map a first view point representation to a point on a plane associated with a location point in a 3D scene in order to generate a second 2D view point representation based on the point on the plane. In another embodiment, data manager 112 may be configured to determine a 3D model of a dynamic object based on the sensor model representation. Data manager 112 may determine a data representation based on the 3D model of the dynamic object. Video renderer 110 may determine a graphical representation based on the 3D model of the dynamic object.

Figure 8:
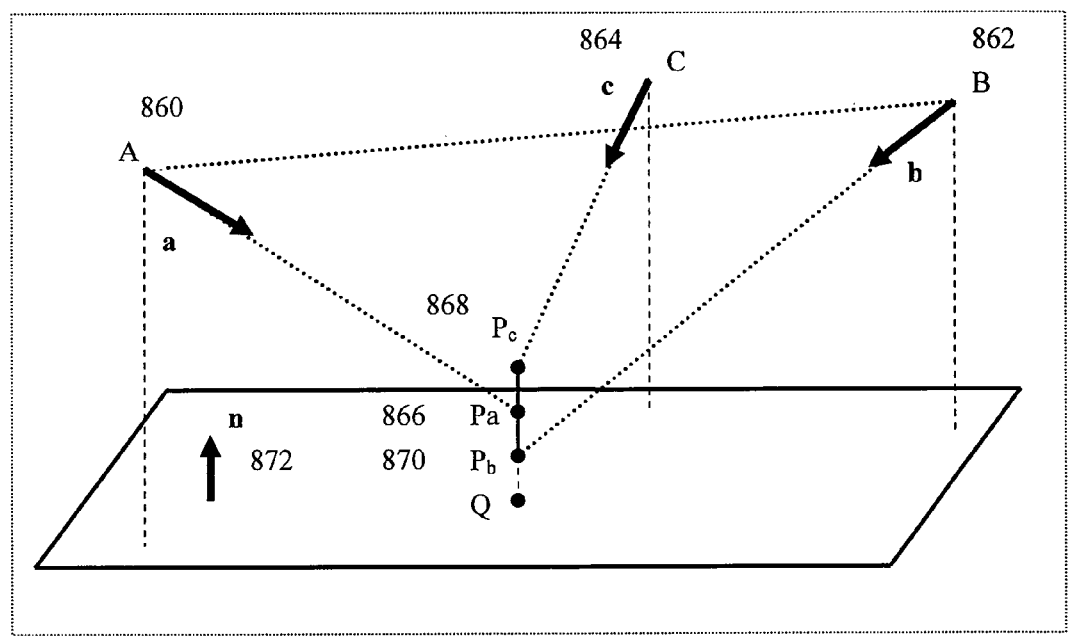
FIG. 8 illustrates mapping a view point position defined using measurements from two or more other view points, according to an embodiment.

3D information directly generated from multiple observation view points may be utilized, according to an embodiment. In some cases, scene information may be determined by using a first 2D view point representation to determine a unifying 2D view point. This unifying 2D view point may be used for unifying information from multiple view points. FIG. 8 illustrates a case where point P 866 is viewed from points C 864 and B 862 with observations $\hat{c}$ 864 and $\hat{b}$ 862 respectively. Due to measurement error, $\hat{c}$ 864 and $\hat{b}$ 862 are expected to correspond to $P_c$ 868 and $P_b$ 870, which are offset from P 866. Assuming $P_c=(C+\hat{c}\delta_1)$ and $P_b=(B+\hat{b}\beta_1)$, a reasonable approximation for P 866 would be the average of $P_c$ and $P_b$, which may be rewritten in the following form $$P = 1/2(P_c + P_b) = \qquad (15)$$
$$1/2(C + B + \hat{c}\delta_1 + \hat{b}\beta_1) = 1/2\|\overline{CB}\|\left[\frac{C+B}{\|\overline{CB}\|} + \hat{c}\delta + \hat{b}\beta\right]$$

The problem at hand is to derive values for $\delta$ and $\beta$ that minimize the error between the formulated point P and points $P_c$ and $P_b$, which are based on measurements. This may be done by minimizing an objective function based on P, $P_c$, $$P_b \text{ and } \overline{cb} = \overline{CB}/\|\overline{CB}\|, \qquad (16)$$
$$E = (P - P_c)^T(P - P_c) + (P - P_b)^T(P - P_b)$$
$$= 1/2\|\overline{CB}\|^2\left[(\overline{cb} + \hat{b}\beta)] - \hat{c}\delta\right]^T\left[(\overline{cb} + \hat{b}\beta)] - \hat{c}\delta\right]$$

Equations for finding $\delta$ and $\beta$ may be found by taking the partial derivative of (16) and setting it equal to zero, yielding $$\partial E/\partial \delta = \delta - (\overline{cb}^T \hat{c}) - (\hat{b}^T \hat{c}\delta) = 0$$
$$\partial E/\partial \beta = \beta - (\overline{cb}^T \hat{b}) - (\hat{c}^T \hat{b}\delta)) = 0 \qquad (17)$$

$\delta$ and $\beta$ may be found from these equations, $$\delta = [(\overline{cb}^T \hat{c}) - (\hat{c}^T \hat{b})(\overline{cb}^T \hat{b})]/[1 - (\hat{c}^T \hat{b})]$$
$$\beta = [(\overline{cb}^T \hat{c})(\hat{c}^T \hat{b}) - (\overline{cb}^T \hat{b})]/[1 - (\hat{c}^T \hat{b})] \qquad (18)$$

Since the scalars $\delta$ and $\beta$ exclusively consist of normalized direction vectors, they are free from magnitude information and hence do not preserve the location of points $P_c$ and $P_b$ in 3D world coordinates. The vector and magnitude from observation view point C 864 to the compute point P 866 may be formulated using (15), yielding a normalized vector $$\hat{a} = \frac{\overline{AP}}{\|\overline{AP}\|} = \frac{(\hat{c}\delta + \hat{b}\beta) + (\overline{AC} + \overline{AB})/\|\overline{CB}\|}{\sqrt{\left((\hat{c}\delta + \hat{b}\beta) + (\overline{AC} + \overline{AB})/\|\overline{CB}\|\right)^T \left((\hat{c}\delta + \hat{b}\beta) + (\overline{AC} + \overline{AB})/\|\overline{CB}\|\right)}} \qquad (21)$$

Note that in the final form, the factor $\|\overline{CB}\|$ in (15) divides out in the normalization. As a consequence, neither the numerator nor the denominator contains real world magnitude $\|\overline{AP}\|$ for the normalized direction vector $\hat{a}$. Likewise, none of the components or combination of components in brackets in (21) constitutes a real-world position of measured points. Thus, this may be computed in stages without the concern that 3D coordinate information of measurements is generated by an intermediate step. This formulation may be generalized to incorporate the input from N>2 observation points. This will result in more than two equations for (17) that should be solvable using matrix inversion, computed directly or indirectly (Ax=b solution).

One advantage of view point representation over 3D world coordinates is that it enables information to be optimized from the perspective of the observations. The error function in (16) may be modified to take into account perspective $E = (P - P_c)^T D(P - P_c) + (P - P_b)^T D (P - P_b)$. The matrix D weights the error such that the error orthogonal to the direction $\overline{AP}$ is optimized. This may be an iterative routine that computes the position of the object using (16), and uses the computed direction $\hat{a}$ to determine the weighting for the final calculation. This may be also applied to the problem of minimizing error of multiple camera measurements for objects expected to reside on the playing surface.

The problem of deriving 3D shape of an object relative to a reference point on the object may be addressed. This may have applications in advanced 3D analysis and 3D graphical representation of objects perceived in the video. According to an embodiment, a possible representation for shape would be 3D physical offsets from a reference point that is not explicitly described in 3D world coordinates. This allows the 3D model of a dynamic object to move with the object, provided the same reference point may be identified on the object between time instances. The 3D model may be a virtual surface defined in relationship to the location point of a dynamic object. Additional sensor model representations corresponding to additional location points of the dynamic object may allow the size and shape and orientation of the virtual surface representing the 3D object to more closely conform to reality. For example, sensor model representation for location points and the head and feet of a player, may allow the vertical extend of the model to be appropriately modified.

One approach for deriving a location point relative to another location point may include computing a position vector relative to a reference point defined from a single camera, according to an embodiment. In FIG. 8, suppose the normalize vector $\hat{c}_q$ at point C 864 is directed toward point Q 874. The vector from point Q 874 to point P may be found from (15)

$$\overline{QP} = P - (C + \overline{CQ}) = \tfrac{1}{2}\overline{CB} + \tfrac{1}{2}\overline{CB}(\hat{c}\delta + \hat{b}\beta) - \hat{c}_q(\hat{n}^T S - \hat{n}^T C)/\hat{n}^T \hat{c}_q \qquad (22)$$

Recall that $\hat{n}^T S$ represents a distance the $\hat{n}$ plane is from the origin along the normal $\hat{n}$. The scalars $\delta$ and $\beta$ are defined in (18) and exclusively consist of normalized direction vectors so they are free from magnitude information.

A second approach for deriving a location point relative to another location point may be to find the vector $\overline{QP}$ from normalized vectors $\hat{c}_q$ and $\hat{b}_q$ that are directed toward point Q 874, according to another embodiment. This derivation follows from (15)

$$\overline{QP} = P - Q = \tfrac{1}{2}\overline{CB}(\hat{c}\delta + \hat{b}\beta - \hat{c}_q\delta_q - \hat{b}_q\beta_q) \qquad (23)$$

The scalars $\delta_q$ and $\beta_q$ are defined by substituting $\hat{c}_q$ and $\hat{b}_q$ for $\hat{c}$ and $\hat{b}$ in (18). This approach has the natural advantage that the reference point on the object is not connected to a plane.

The above displacement vectors $\overline{QP}$ may be used to derive the displacement distance in a particular direction in real-space, according to an embodiment. For example, scene measurements such as the height of a basketball player jump may be derived and delivered as part of a broadcast covering a sporting event. This approach may be distinct from approaches that compute the object position in world coordinates. For FIG. 8, Q 874 may represent a point on a player before the jump and P is the same point during the height of the jump. The jump height in the direction of the plane normal $\hat{n}$ 872 would be represented by $$d_n = \hat{n}^T \overline{QP} \qquad (24)$$

For this consideration, $\overline{QP}$ may be derived either using (22) or (23).

Figure 9:
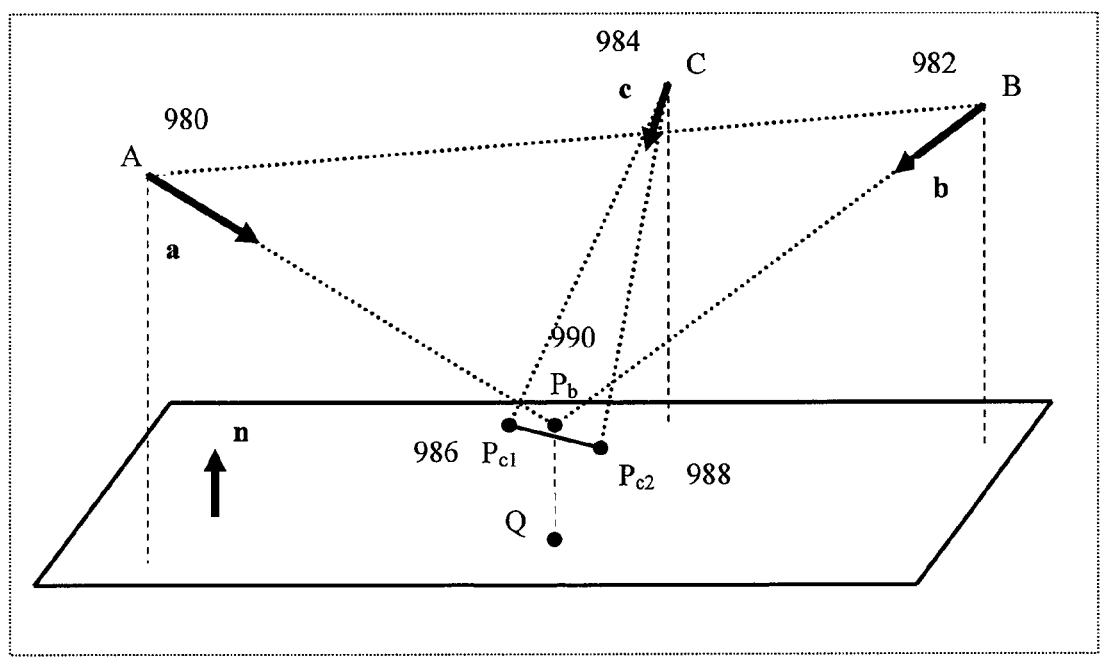
FIG. 9 illustrates mapping a view point position defined using measurements from two or more other view points from unsynchronized sources, according to an embodiment.

The above analysis using measurements from multiple observation points assumes the data approximately aligned temporally. This may be normally achieved using cameras that are locked to a synchronous gen-lock signal. The problem of finding angular measurements using two sources with shifted sampling rates may be considered. For example, FIG. 9 shows a short segment of an object's trajectory, with two directional measurements from observation position B 982 and one from observation position C 984. A planar virtual surface may be used to model in three-dimensions the trajectory of the object. The normal vector of the plane may be found, including points C 984, $P_{c1}$ 986 and $P_{c2}$ 988 from the cross product of direction vectors, $\hat{n}_C^T = \hat{c}_1 \times \hat{c}_2$. This allows the direction vector â to be found in terms of $\hat{b}$ using (10), $\hat{a} = T\hat{b}/(\hat{b}^T T^T T\hat{b})^{1/2}$. The key difference includes changes to the translation matrix T to accommodate the different plane normal $\hat{n}_C^T$, $$T = [\overline{AB}\hat{n}_C^T/(\hat{n}_C^T \overline{CB}) + I] \quad (25)$$

This methodology may be used to convert a series of measurements from positions B 982 and C 984 into corresponding measurements from position A 980. Individual measurements from B 982 may be combined with nearest measurements from C 984, and vice versa when processing measurements from C. The fact that data may be aligned spatially may have the advantage of limiting the need to synchronization temporally, producing an easier method for alignment.

Figure 10:
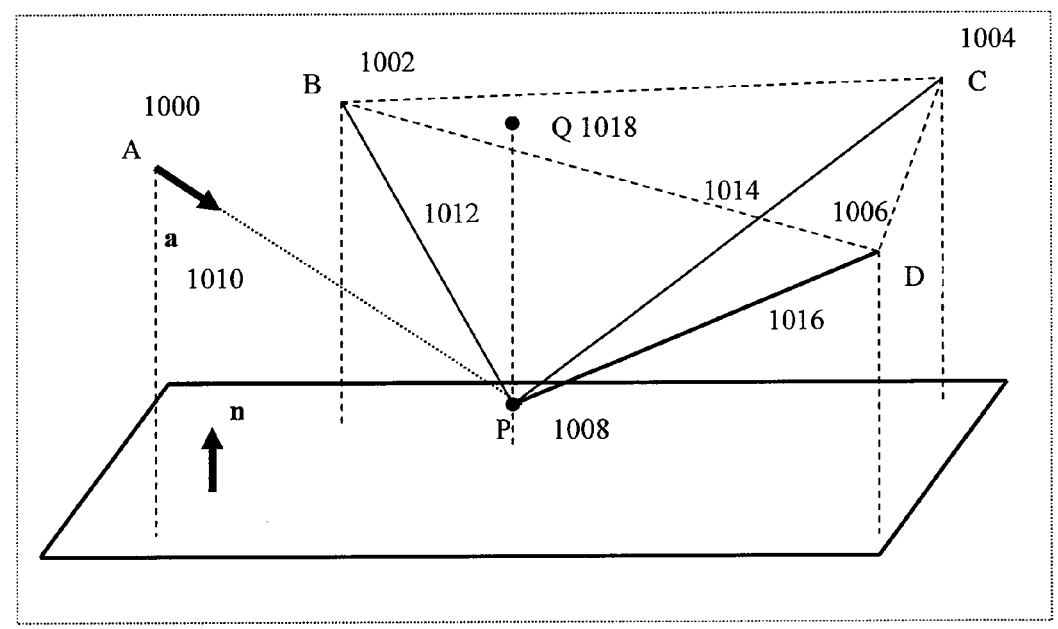
FIG. 10 illustrates mapping a view point position defined using trilateral sensor technology, according to an embodiment.

Trilateralization is an approach that may be used to determine an object's position based on a distance from known transmitter or receiver locations. It is a basic approach used in deriving a position from GPS. Variations, such as multitrilateralization, may be used as part of a puck tracking effect used by broadcasters. FIG. 10 highlights a problem of detecting an object that may be a fixed distance from receiver points. Positions B 1002, C 1004 and D 1006 are observation points of an object at P 1008. In this scenario, the magnitude of vectors $\|\overline{BP}\|$ 1012, $\|\overline{CP}\|$ 1014, and $\|\overline{DP}\|$ 1016 may be known but not the corresponding directions. The normalized direction vector â 1010 for observation point A 1000 may be found in terms of the observation point B 1002 vector $\overline{BP}$ 1012, $$\hat{a} = \frac{\overline{AP}}{\sqrt{\overline{AP}^T \overline{AP}}} = \frac{(\overline{ab} + \overline{BP}/\|\overline{AB}\|)}{\sqrt{(\overline{ab} + \overline{BP}/\|\overline{AB}\|)^T (\overline{ab} + \overline{BP}/\|\overline{AB}\|)}}. \quad (26)$$

Recall that $\overline{ab}$ may be a the normalized vector in the direction of $\overline{AB}$. Points P 1008 and Q 1018 lie on planes normal to the vectors $\overline{bc}$ and $\overline{bd}$, $$\overline{BP}^T \overline{bc} = \frac{(\|\overline{BC}\|^2 + \|\overline{BP}\|^2 - \|\overline{CP}\|^2)}{\|\overline{BC}\|}, \quad (27)$$

$$\overline{BP}^T \overline{bd} = \frac{(\|\overline{BD}\|^2 + \|\overline{BP}\|^2 - \|\overline{DP}\|^2)}{\|\overline{BD}\|}.$$

Point Q 1018 may be additionally constrained to the plane defined by the cross product $\overline{bc} \times \overline{bd}$, so that $$\overline{BQ} = \frac{(\|\overline{BC}\|^2 + \|\overline{BP}\|^2 - \|\overline{CP}\|^2)}{\|\overline{BC}\|}\overline{bc} + \frac{(\|\overline{BD}\|^2 + \|\overline{BP}\|^2 - \|\overline{DP}\|^2)}{\|\overline{BD}\|}\overline{bd} \quad (28)$$

Point P 1008 may lie on a line in the direction of $\overline{bc} \times \overline{bd}$ passing through point Q 1018, so that $$\overline{QP} = (\overline{bc} \times \overline{bd})\|\overline{QP}\| = (\overline{bc} \times \overline{bd})(\|\overline{BQ}\| - \|\overline{BP}\|) \quad (29)$$

A closed form for â may be achieved substituting $\overline{BP} = \overline{BQ} + \overline{QP}$ in (28) and (29) into (26). In some cases, this may be extended to additional sensor measurements, as finding the position from multitrilateralization is known in the art. In some cases, a map may be created to determined a third 2D view point representation based on first and second 2D view point representations.

Figure 11:
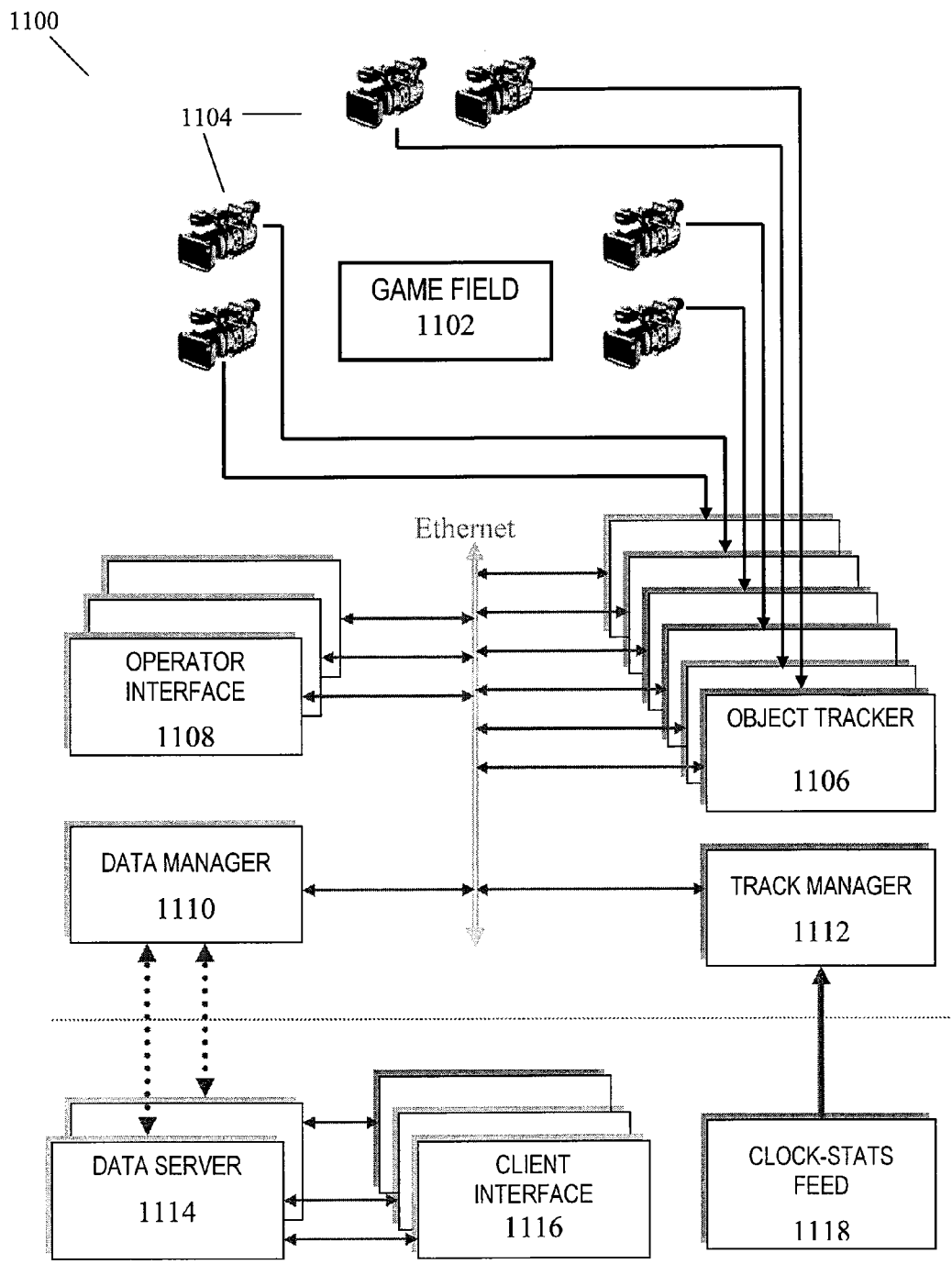
FIG. 11 illustrates a statistics generation embodiment of this invention.

FIG. 11 shows an exemplary system 1100, which may be used to generate information about an athletic event and its components, according to an embodiment. System 1100 may include a sensor system 1104. Sensor system 1104 may include one or more sensors to receive information relating to an athletic event on game field 1102. This information may include information about objects in the athletic event. These objects may include one or more athletes, game objects, game field objects, etc. In most cases, this information includes video signals or images. This information may also include other information such as sensor position, angle, height, location relative to game field 1102, time, or any other information related to the athletic event. Game field 1102 may refer to a playing field, natural field, artificial field, court, ice rink or any other athletic playing surface.

According to an embodiment, sensor system 1104 may include one or more cameras. In some cases, sensor system 1104 may include multiple prosumer, or professional-grade, high definition (HD) cameras mounted in different locations in an arena/stadium, each covering a portion of the playing surface of game field 1102. In a further embodiment, sensor system 1104 may include non-visual object sensors. In other cases, sensor system 1104 may include wireless sensors, global positioning system (GPS) sensors or radio frequency identification (RFID) sensors. In some cases, sensor system 1104 may include a mobile device, such as a smart phone or electronic tablet. In other cases, sensor system 1104 may include multiple unsynchronized sensors. Sensor system 1104 may include any other sensors to record signals and information about an athletic event and to detect, observe or track objects. In another embodiment, sensor system 1104 may be configured to record information from the athletic event on game field 1102.

Sensor system 1104 may be coupled to object tracker 1106, according to an embodiment. Sensor system 1104 may provide media signals or object information to object tracker 1106. In some cases, system 1100 may be configured to use video tracker 104, as described above. According to an embodiment, object tracker 1106 may be configured to derive a two dimensional (2D) view point representation of a location point in the 3D scene, wherein the sensor model representation is generated using sensor system 1104. 2D view point representations may be provided to data manager 1110. According to an embodiment, object tracker 1106 may be configured to receive camera information for an athletic event. In another embodiment, object tracker 1106 may be configured to receive camera information from an external source other than sensor system 1104. Such a source may be another database or media stored on a disc, tape, memory or other storage device. In yet another embodiment, sensor system 1104 may extract data from recorded media or a recorded broadcast of an event.

In some cases, there may be more than one object tracker 1106, each coupled to one or more sensors of sensor system 1104. In another embodiment, object tracker 1106 may be configured to analyze sensor signals to generate a 2D viewpoint representation for one or more objects. In most cases, a sensor signal may be a video signal. In a further embodiment, a sensor to representation mapping may be achieved using a sensor model created, in part, by a calibration process. According to many embodiments, object tracker 110 may be configured to perform further operations, as described in patent application Ser. No. 12/403,857. In an embodiment, object tracker 1106 may be configured like object tracker 106 of FIG. 1. This may be true for other components of FIG. 11. For instance, data manager 1110 may be configured like data manager 112 of FIG. 1.

In an embodiment, object tracker 1106 may be configured to record a number of characteristics of objects in an athletic event in order to form 2D view point representations. In some cases, object tracker 1106 may record information about a certain area of game field 1102 or a certain area above game field 1102.

2D viewpoint representations of objects may be sent to centralized track manager 1112 for data fusion, combination or processing, according to an embodiment. Track manager 1112 may be coupled to object tracker 1106 directly, or indirectly through a network such as an Ethernet. Track manager 1112 may be configured to align image or video tracks with a time-stamp of a game clock. According to a further embodiment, track manager 1112 may be configured to receive official statistics or roster information from stats feed 1118. Such information may include, but are not limited to, more familiar information such as shots, scores, steals, corner kicks, hockey hits, football passes, running back carries, etc. According to another embodiment, athletes and objects may be labeled. Such labels may include a role of each player. These labels may be combined with a current roster from stats feed 1118 to identify individual tracks. In a further embodiment, track manager 1112 may be configured to analyze average track times of one or more athletes in order to determine possession or a time of possession.

According to an embodiment, data manager 1110 may organize track information from track manager 1112 into a coherent database representation. This involves combining label information, manually generated by one or more operator interfaces 1108, to augment decisions related to track management by track manager 1112. Data manager 1110 may be configured to transmit information to or store data in data servers 1114. In most cases, data servers 1114 may be located at remote locations such as a broadcast truck, broadcast center or centralized league headquarters. Data servers 1114 may also be coupled directly, or indirectly over a network to client interfaces 1116. In one embodiment, track manager 1112 functionality is performed by data manager 1110. In another embodiment, object tracker 1106 functionality is performed by data manager 1110.

Data manager 1110 may receive 2D view point representations from object tracker 1106, according to an embodiment. Data manager 1110 may be configured to use 2D view point representations to determine other 2D view point representations. This may be performed without finding 3D coordinates. In another embodiment, data manager 110 may be configured to use 2D view point representations to determine data representations or scene measurements in a 3D scene involving a location point in the 3D scene. Data manager 1110 may be also configured to determine a 3D model of a dynamic object based on the sensor model representation. Data manager 1110 may be further configured to determine a data representation based on the 3D model of the dynamic object. Object tracker 1106, track manager 1112, or data manager 1110 may be software, firmware, or hardware or any combination thereof in a computing device. A computing device may be any type of computing device having one or more processor s. For example, a computing device may be a workstation, mobile device (e.g., a mobile phone, personal digital assistant, or laptop), computer, game console, set-top box, kiosk, embedded system or other device having at least one processor and memory. It should be noted that terms such as object tracker, track manager and data manager are used for purposes of explanation. In some cases, certain functions of one of these components may be performed by another.

Information may also be delivered to client interfaces 1116. According to an embodiment, client interfaces 1116 may include a data terminal for broadband applications. In such a case, data may be streamed from data server 1114 to end-users for use on portable mobile devices. Data may also be provided to client interfaces 1116 directly from data manager 1110. In some cases, video or still images may be displayed on a screen of a client interface 1116 Client interfaces 1116 may include a graphics engine for broadcast. Client interfaces 1116 may also include a renderer configured to display an image based on 2D view point representations. The renderer may also be configured to determine a data representation based on a 3D model of a dynamic object. In one embodiment, the data manager 1110 generates 3D model used by the renderer to generate a graphical presentation. In another embodiment, the renderer generates a 3D model of a dynamic object used to generate a graphical presentation. According to some embodiments, this renderer may be configured like video renderer 110. In some cases, a renderer will help to display an image during a live broadcast of the athletic event. According to an embodiment, a renderer may be used to display an image within a larger image of the event. For example, a graphic picture or statistic pertaining to an athlete may be shown on or near an athlete during a display of the athletic event. In other cases, images and video may be displayed subsequent to the occurrence of the event. According to another embodiment, an image may include an index of images or video clips. Images and video clips may be indexed. Indexing may also be performed with values, official statistics or any other useful information.

Figure 12:
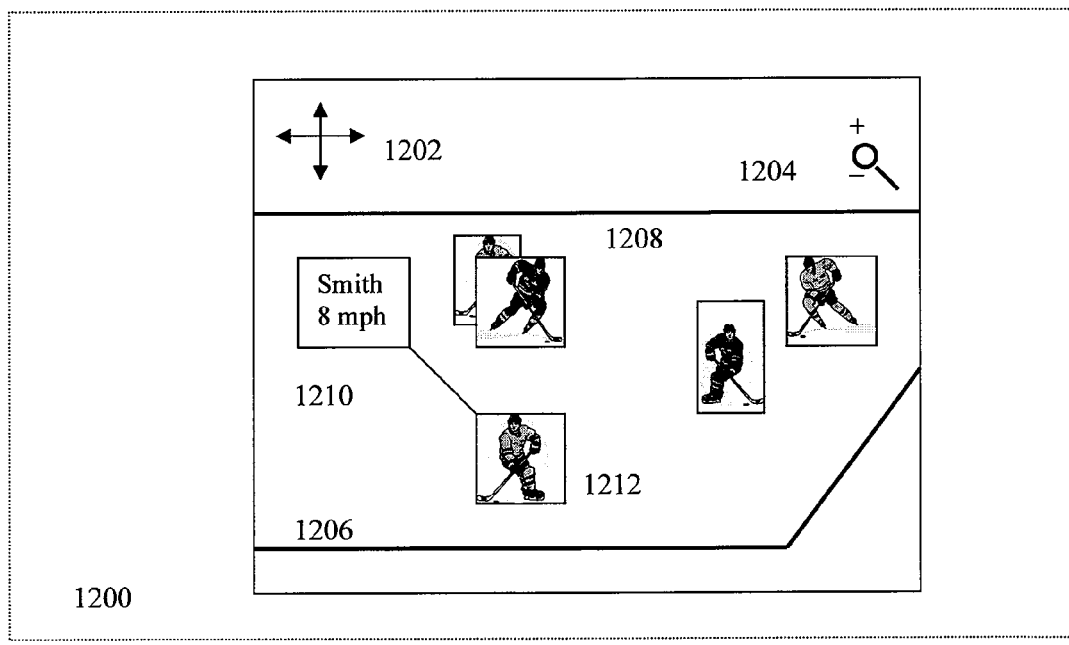
FIG. 12 illustrates a user driven view port of a live sporting event, according to an embodiment.

FIG. 12 shows an exemplar application for broadband and portable media interfaces, according to an embodiment. FIG. 12 illustrates a view port 1200 of a sporting event, such as a hockey game. A user may be given an option to select a portion of the scene through pan/tilt controls 1202 and zoom controls 1204. A user may also user select a moving location point of at least one dynamic object. The playing surface is represented by a high resolution image or bitmap 1206. Video sprite images or animation images of the players may be positioned over background 1208 using view point information. For example, player image 1212 is shown. Positioning of sprites may be accomplished using (14). Animations of dynamic objects may be rendered using 3D models of the dynamic objects. The animations modeled by planes may be rendered to the view port using (22) and (23). When player metadata is available, an information bubble 1210 may appear with relevant information through a user click on player image 1212. In some cases, a motion distance relative to time may be determined and displayed. In a further embodiment, a user may change the point of view position beyond the pan, tilt 1202 and zoom 1204. Alternately, a view port may be set from the viewing perspective of a fan sitting in the arena using a GPS locator in the display device. This would allow the user to see replays from his or her perspective. In another embodiment, a user may select a viewing perspective by selecting a seat location from an interface, which may include a seating chart graphic. In a further embodiment, a viewing perspective may approximate the viewing perspective of a particular portion of the seating at a sporting event. The graphical representation may be presented on an animated display mounted in the sports arena or stadium, visible by the viewers in the particular portion of the seating in the venue. In some embodiments, operator control 108 may enable a user to perform the activities above. Operator control 108 may also allow a user to select perspectives, objects, location points, portions of a 3D scene, 3D models or any other object or representation in a view port.

Figure 13A:
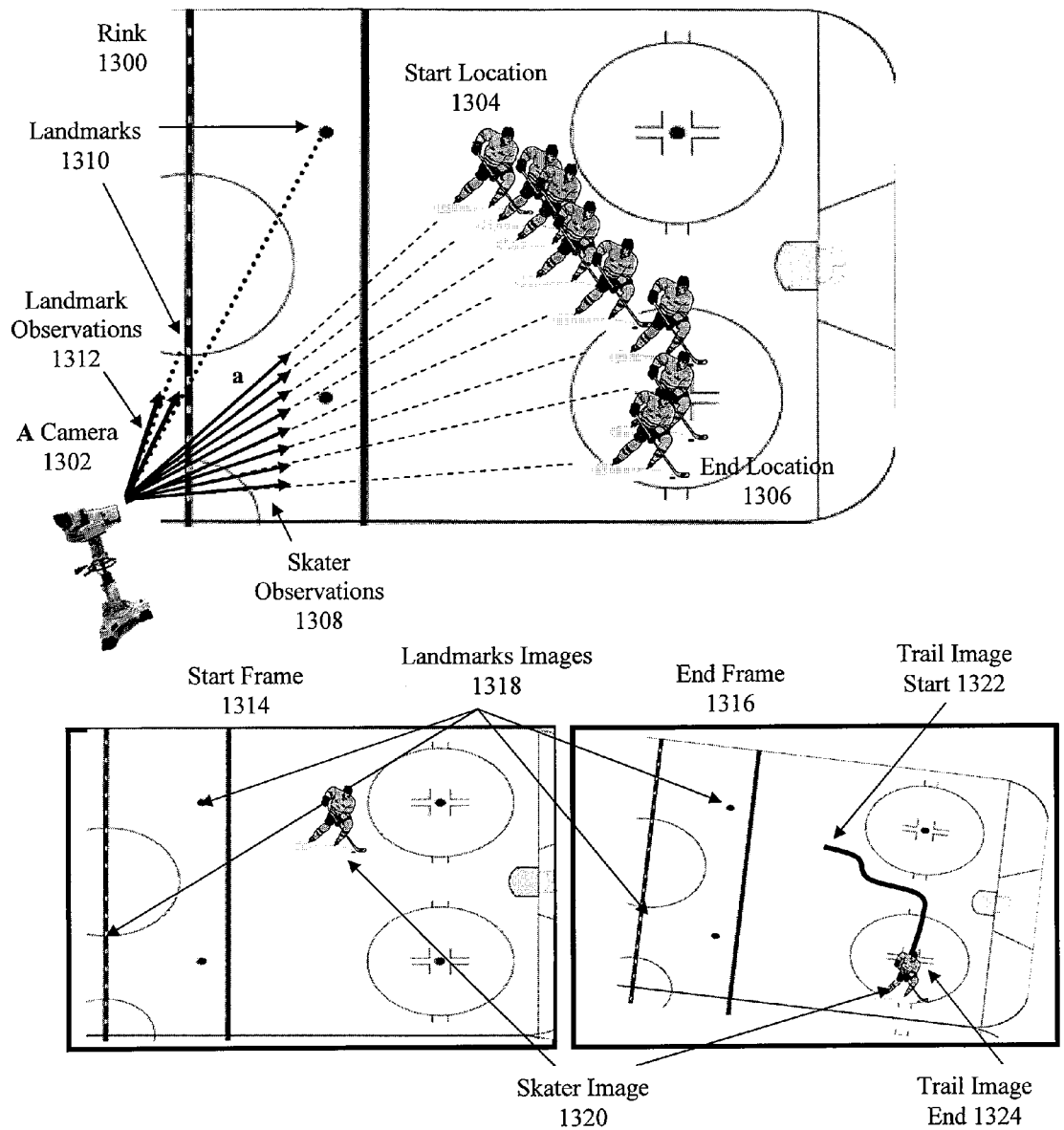
FIGS. 13A-C are exemplary applications, according to some embodiments.
Figure 13B:
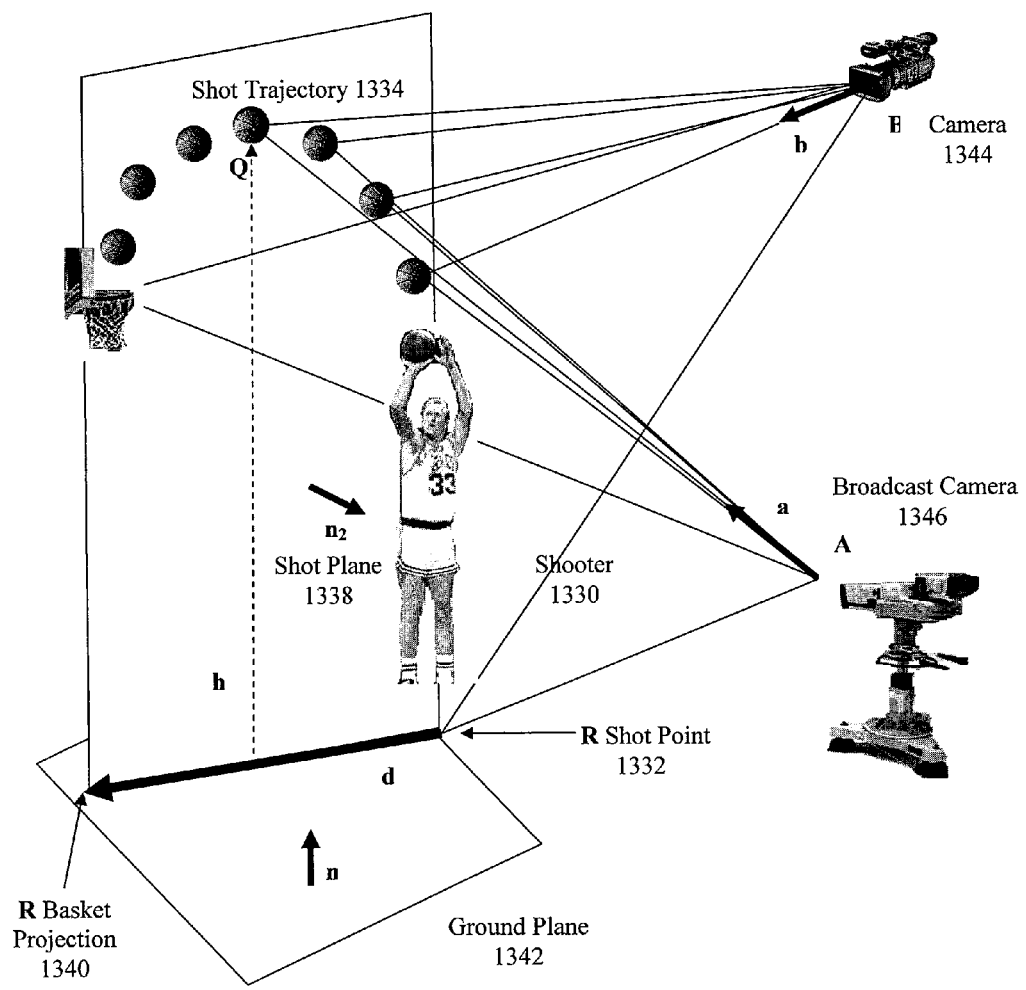
Figure 13C:
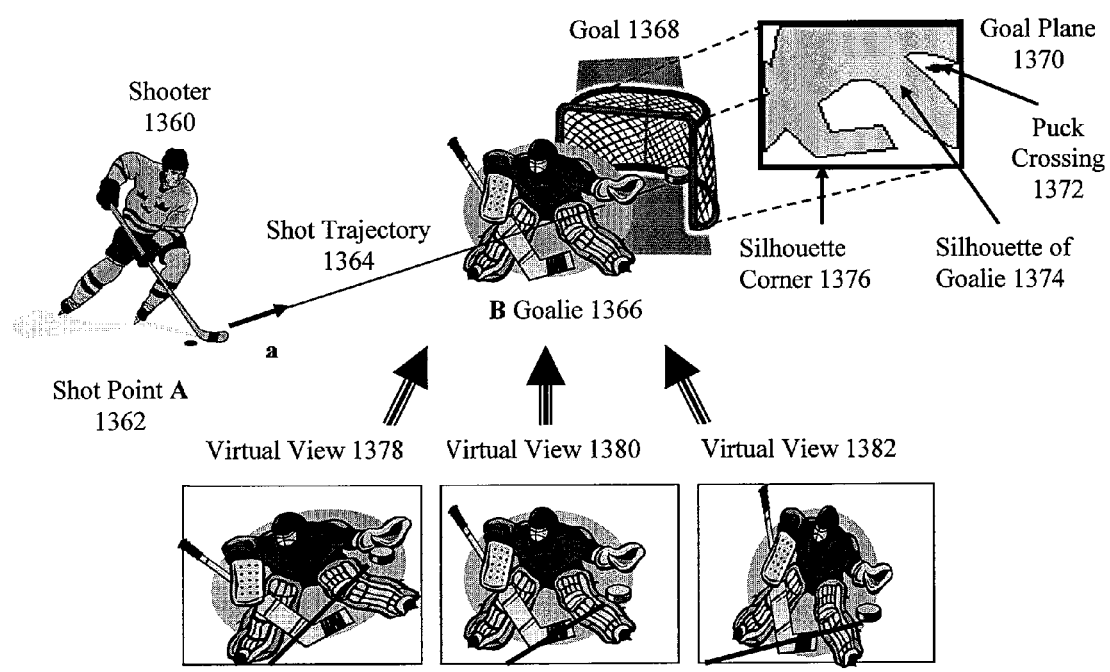

FIGS. 13A-C are exemplary applications for system 100, according to some embodiments. For example, FIG. 13A demonstrates the ease of constructing a broadcast effect for a tripod mounted camera without the need for accurate range information to objects in the scene. Hockey rink 1300 is viewed by a broadcast camera 1302. A hockey skater is observed from a start location 1304 to an end location 1306. This may be represented as a series of normalized view point vectors a 1308, each centered with camera position A 1302. Fixed locations on the playing surface (landmarks 1310) may also be represented as view point observations 1312. Suppose camera 1302 captures the movement of a skater from 1304 to 1306 in a video sequence with a start frame 1314 and end frame 1316. A screen position of landmarks 1318 and associated stored view point observations 1312 may be used to derive a mapping between individual video frames and a view point representation. The skater image in successive frames 1320 may be used to derive view points observations 1308 corresponding to the skater location. Historical observations of the skater may be mapped back to screen coordinates in the current frame 1316. This may be used to derive a trail graphic corresponding to the skater start location 1304 to end location 1306. The graphic may be rendered into the broadcast video to appear to be attached to the playing surface, and include occlusion of foreground objects.

According to an embodiment, view point representation of landmark features may facilitate the process of deriving a mapping between video screen location and a view point representation. The mapping of camera screen locations to view point observations a at A is described by (4), which may be summarized as $$\hat{A}_N = R\hat{C}_N. \tag{31}$$

$\hat{A}_N$ is a composite of N stored view point observations corresponding to landmarks 1310 on the playing surface, $$\hat{A}_N = \begin{bmatrix} x_1 & x_2 & \ldots & x_N \\ y_1 & y_2 & \ldots & y_N \\ z_1 & z_2 & \ldots & z_N \end{bmatrix} \tag{32}$$

$\hat{C}_N$ is the current camera representations corresponding to the same landmarks 1318 in the video frame, $$\hat{C}_N = \begin{bmatrix} u_1 & u_2 & \ldots & u_N \\ f_A & f_A & \ldots & f_A \\ v_1 & v_2 & \ldots & v_N \end{bmatrix} \tag{33}$$

$$\begin{bmatrix} \frac{1}{\sqrt{u_1^2 + f_A^2 + v_1^2}} & 0 & \ldots & 0 \\ 0 & \frac{1}{\sqrt{u_2^2 + f_A^2 + v_2^2}} & \ldots & 0 \\ \ldots & \ldots & \ldots & \ldots \\ 0 & 0 & \ldots & \frac{1}{\sqrt{u_N^2 + f_A^2 + v_N^2}} \end{bmatrix}$$

The second matrix in (33) is a normalization constant that ensures the dot product of individual vectors in the first matrix will be 1. The difference between the view point and actual camera representations may be quantified using the following, $$(\hat{A}_N - R\hat{C}_N)(\hat{A}_N - R\hat{C}_N)^T. \tag{34}$$

Focal length $f_A$ and rotation matrix R may be found iteratively by estimating the focal length and solving for R using the ordinary linear solution $R = (\hat{C}_N \hat{C}_N^T)^{-1}(\hat{C}_N \hat{A}_N^T)$. The objective is to determine a focal length and rotation matrix that ultimately minimizes (34). Another approach is to find $f_A$ and R using a direct linear transform solution. Alternately, solutions are known in the art to derive individual camera components for pan, tilt, roll and $f_A$. This expands the rotation matrix R into three individual rotation matrices as in (4).

FIG. 13B shows a basketball shooter 1330 at shot point 1332 that shoots a ball along a trajectory 1334 to the vicinity of basket 1336, according to another embodiment. For vertical jump shots directed to the hoop, shooter 1330, shot point 1332, ball trajectory 1334 and basket 1336 are contained in plane 1338, with a normal $n_2$. The 3D model for the trajectory of the ball, a dynamic object, may be a plane defined in reference to the player, another dynamic object. Shot distance d is a distance along the ground plane 1342 between shot point P 1332 and basket projection R 1340. The height of the ball at Q relative to the ground plane is denoted by h. The locations of objects and positions on the shot plane are viewed by a camera 1344 at B with view point observations b, and viewed by broadcast camera 1346 at A with view point observations a. In some cases, data manager 112, or data manager 1110, may be configured to determine a 3D model. Data manager 112 may be further configured to generate a first plane associated with a dynamic object at a fixed angle relative to a second plane associated with a location point. In some cases, this fixed angle is orthogonal, or approximately orthogonal. In other cases, the angle may be, but is not limited to, an angle above 75 degrees. Data manager 112 may be additionally configured to determine a data representation based on the 3D model of the dynamic object. A renderer, such as video renderer 110, may be configured to determine or generate a graphical representation based on the 3D model.

Translation matrix T maps observations from camera B to A in terms of surface normal n and $n_2$, as described in (14). Alternately, translation matrix T may be computed directly by pairing corresponding observation vectors b to a. For instance, suppose N positions in a shot plane are observed from cameras 1344 and 1346. The locations may include fixed landmarks (such as 1332, 1336, or 1340) or moveable objects (such as 1330 or 1334). The translation mapping of observations b to a using shot plane 338 may be formulated directly as follows:

$$\begin{bmatrix} x_{a1} & x_{a2} & & x_{aN} \\ y_{a1} & y_{a2} & \ldots & y_{aN} \\ z_{a1} & z_{a2} & & z_{aN} \end{bmatrix} = \hat{A}_N = T\hat{B}_N = \begin{bmatrix} t_{11} & t_{12} & t_{13} \\ t_{21} & t_{22} & t_{23} \\ t_{31} & t_{32} & t_{33} \end{bmatrix} \begin{bmatrix} x_{b1} & x_{b2} & & x_{bN} \\ y_{b1} & y_{b2} & \ldots & y_{bN} \\ z_{b1} & z_{b2} & & z_{bN} \end{bmatrix} \tag{35}$$

The matrix that minimizes the error between observations b and a may be found by minimizing the objective function $$(\hat{A}_N - T\hat{B}_N)(\hat{A}_N - T\hat{B}_N)^T. \quad (36)$$

The ordinary linear solution has the form.

$$T = (\hat{B}_N \hat{B}_N^T)^{-1}(\hat{B}_N \hat{A}_N^T). \quad (37)$$

This translation mapping has a variety of applications, such as creating a 3D graphic of a shot trajectory captured with camera 1344 and displayed in camera 1346. The direct mapping approach also may be used to map observations b to a using the playing surface plane 1342.

Shot distance d may be found as a magnitude $\|\overline{PR}\|$ described in (13), where n is a normal of the playing surface, and $\hat{b}_P$ is an observation of shot point P 1332 and $\hat{b}_R$ is an observation of a point R under a basket. The normal of the shot plane may be found from a cross product between shot direction $\overline{PR} = (\hat{n}^T S - \hat{n}^T B)[\hat{b}_R / (\hat{n}^T \hat{b}_R) - \hat{b}_P / (\hat{n}^T \hat{b}_P)]$ and the normal of the playing surface n, $$\hat{n}_2 = \hat{n} \times \overline{PR} = (\hat{n}^T S - \hat{n}^T B) \left[ \frac{\hat{n} \times \hat{b}_R}{\hat{n}^T \hat{b}_R} - \frac{\hat{n} \times \hat{b}_P}{\hat{n}^T \hat{b}_P} \right]. \quad (38)$$

Recall that $(\hat{n}^T S - \hat{n}^T B)$ is a distance of a camera at B to playing surface (S).

The height of the ball may also be computed directly from view point observations. Suppose a trajectory of a ball with the position Q may be described as a vector from the shot point P 1332. Similar to (13), vector $\overline{PQ}$ may be found as a function of shot plane normal $\hat{n}_2$ and observation vectors to P and R, $\overline{PQ} = (\hat{n}_2^T S - \hat{n}_2^T B)[\hat{b}_Q / (\hat{n}_2^T \hat{b}_Q) - \hat{b}_P / (\hat{n}_2^T \hat{b}_P)]$. As in (24), the height may be found by taking a dot product with ground plane normal n, $$|\hat{n}^T \overline{PQ}| = \left| (\hat{n}_2^T S - \hat{n}_2^T B) \left[ \frac{\hat{n}^T \hat{b}_Q}{\hat{n}_2^T \hat{b}_Q} - \frac{\hat{n}^T \hat{b}_P}{\hat{n}_2^T \hat{b}_P} \right] \right|. \quad (39)$$

The quantity $(\hat{n}_2^T S - \hat{n}_2^T B)$ is the distance from observation point B to shot plane (S) along the normal of $n_2$. As seen, the height of the ball is computed directly from observation vectors and the distance from the observation point B to the shot plane. The height of the ball at its peak may be ascertained by comparing a ball height at multiple points along the ball trajectory and selecting the maximum. The value may be provided to fans or analyst using a broadcast graphic or verbally reported by the announcer. Alternately, coaches receive the information as part of a coaching tool. Data manager 112 may be configured to determine a data representation based on the 3D model of the dynamic object. A renderer, such as video renderer 110, may be configured to determine or generate a graphical representation based on the 3D model.

FIG. 13C is another exemplary application of system 100, according to an embodiment. FIG. 13C demonstrates a use of virtual view point representations in the creation of an effect for broadcast, web or mobile platforms. A hockey shooter 1360 shoots the puck from a shot point 1362 along trajectory 1364 past the opposing team goalie 1366 into the goal 1368. A plane at the boundary of goal 1368 may be represented 1370 with a location of a puck crossing 1372 of goal plane 1368, and a silhouette 1374 of goalie 1366 formulated using corner points 1376 on the silhouette boundary.

A position of goalie 1366 and trajectory 1364 of the puck may be mapped to observations a made at shot point A using dual plane solution (14) for single observation source, with the plane normal to goal plane 1368. In this case, a 3D model for the hockey goalie is a virtual planar surface referenced to the location point of the goalie. A mapping to view point A may be implemented for multiple observation sources using (21). A puck observation may be used to map a boundary the puck crosses at goal plane 1372. Corner points 1376 on the boundary of goalie 1366 may be used to represent a coherent outline of a silhouette 1374. The observations a may be converted into a goal plane graphic 1370 using (6), where the scale of the graphic is set by the focal length of the virtual camera at A.

The trajectory 1364 of the puck and a position of goalie 1366 are represented in multiple virtual views 1378, 1380 and 1382. This may be used to generate an effect of a virtual moving camera with still or moving action (i.e., Matrix effect) for the video broadcast. Alternately, this may be used for a virtual replay with a portable display device, where a virtual view corresponds to a position of a viewer (e.g., arena seat location). Goalie 1366 may be described by vectors from a reference point on goalie B 1366, using (22) or (23), which is in turn translated into the virtual view using a mapping such as in (12). An advantage of this is that a single representation of goalie 1366 may be used to generate multiple virtual views. Data manager 112 may be configured to determine a data representation based on the 3D model of the dynamic object. A renderer, such as video renderer 110, may be configured to determine or generate a graphical representation based on the 3D model.

Figure 14:
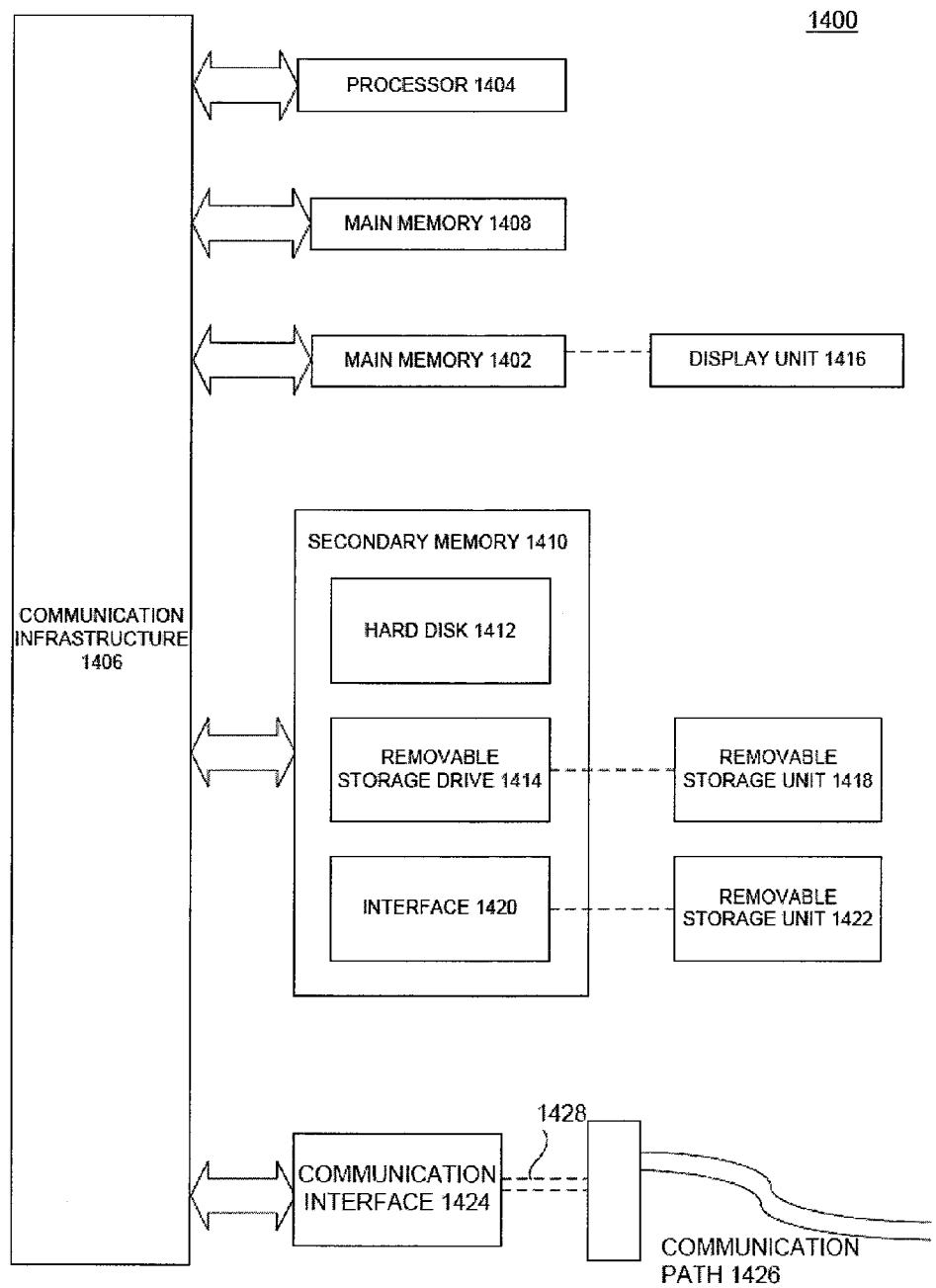
FIG. 14 is a diagram of an example computer system that can be used to implement an embodiment.

Aspects of the present invention, for exemplary systems 100 and 400-1200 and/or methods 200 and 300 or any part(s) or function(s) thereof may be implemented using hardware, software modules, firmware, tangible computer readable or computer usable storage media having instructions stored thereon, or a combination thereof and may be implemented in one or more computer systems or other processing systems. FIG. 14 illustrates an example computer system 1400 in which the present invention, or portions thereof, can be implemented as computer-readable code. For example, sensor system 104, object tracker 110, data manager 140, track manager 120, data server 150, operator interface 112, stats feed 130, client 160 and/or any other components of exemplary system 100 can be implemented in hardware, firmware, or as computer-readable code on a computer system such as computer system 1400. After reading this description, it will become apparent to a person skilled in the relevant art how to implement the invention using other computer systems and/or computer architectures.

Computer system 1400 includes one or more processors, such as processor 1404. Processor 1404 can be a special purpose or a general purpose processor. Processor 1404 is connected to a communication infrastructure 1406 (for example, a bus or network).

Computer system 1400 also includes a main memory 1408, preferably random access memory (RAM), and may also include a secondary memory 1410. Secondary memory 1410 may include, for example, a hard disk drive 1412 and/or a removable storage drive 1414. Removable storage drive 1414 may comprise a floppy disk drive, a magnetic tape drive, an optical disk drive, a flash memory, or the like. The removable storage drive 1414 reads from and/or writes to a removable storage unit 1418 in a well known manner. Removable storage unit 1418 may comprise a floppy disk, magnetic tape, optical disk, etc. which is read by and written to by removable storage drive 1414. As will be appreciated by persons skilled in the relevant art(s), removable storage unit 1418 includes a computer usable storage medium having stored therein computer software and/or data.

In alternative implementations, secondary memory 1410 may include other similar means for allowing computer programs or other instructions to be loaded into computer system 1400. Such means may include, for example, a removable storage unit 1422 and an interface 1420. Examples of such means may include a program cartridge and cartridge interface (such as that found in video game devices), a removable memory chip (such as an EPROM, or PROM) and associated socket, and other removable storage units 1422 and interfaces 1420 which allow software and data to be transferred from the removable storage unit 1422 to computer system 1400.

Computer system 1400 may also include a communications interface 1424. Communications interface 1424 allows software and data to be transferred between computer system 1400 and external devices. Communications interface 1424 may include a modem, a network interface (such as an Ethernet card), a communications port, a PCMCIA slot and card, a wireless card, or the like. Software and data transferred via communications interface 1424 are in the form of signals which may be electronic, electromagnetic, optical, or other signals capable of being received by communications interface 1424. These signals are provided to communications interface 1424 via a communications path 1426. Communications path 1426 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 1418, removable storage unit 1422, a hard disk installed in hard disk drive 1412, and signals carried over communications path 1426. Computer program medium and computer usable medium can also refer to memories, such as main memory 1408 and secondary memory 1410, which can be memory semiconductors (e.g. DRAMs, etc.). These computer program products are means for providing software to computer system 1400.

Computer programs (also called computer control logic) are stored in main memory 1408 and/or secondary memory 1410. Computer programs may also be received via communications interface 1424. Such computer programs, when executed, enable computer system 1400 to implement the present invention as discussed herein. In particular, the computer programs, when executed, enable processor 1404 to implement the processes of the present invention, such as the steps in the method illustrated by flowchart 200 of FIG. 2 discussed above. Accordingly, such computer programs represent controllers of the computer system 1400. Where the invention is implemented using software, the software may be stored in a computer program product and loaded into computer system 1400 using removable storage drive 1414, interface 1420, hard drive 1412 or communications interface 1524.

Embodiments of the invention also may be directed to computer products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for generating information based on perspectives of a three-dimensional scene comprising:
   obtaining a first two-dimensional view point representation of a first location point in the three-dimensional scene based on a sensor model representation, wherein the sensor model representation is generated using a sensor system having a perspective external to the first location point; and
   determining, with a processor-based computing device, a data representation from the first two-dimensional view point representation without finding three-dimensional coordinates of the first location point, wherein the determining the data representation includes deriving from the first two-dimensional view point representation a second two-dimensional view point representation from a second perspective external to the first location point;
   deriving, with the processor-based computing device, a distance measurement value between the first location point and a second location point in the three-dimensional scene; and
   inserting, with the processor-based computing device, the data representation and the distance measurement value into one of the first and second two-dimensional view point representations.

2. The computer-implemented method of claim 1, wherein obtaining comprises:
   receiving the sensor model representation of the first location point in the three-dimensional scene; and
   deriving, with a processor-based computing device, the two dimensional view point representation of the first location point based on the sensor model representation, without finding three-dimensional coordinates of the first location point.

3. The computer-implemented method of claim 1, wherein the determining includes using at least two angle measurements.

4. The computer-implemented method of claim 1, wherein determining includes determining a motion distance relative to time.

5. The computer-implemented method of claim 1, further comprising: providing a graphical image within a larger image of the three-dimensional scene based upon the generated data representation.

6. The computer-implemented method of claim 5, wherein the providing includes providing the graphical image during a display of the three-dimensional scene.

7. The computer-implemented method of claim 1, wherein the determining includes automatically determining a data representation.

8. The computer-implemented method of claim 1, wherein the determining includes determining a three-dimensional location in space based on a normalized vector of the first location point.

9. A system for generating information based on perspectives of a three-dimensional scene comprising:
  an object tracker configured to determine a first two-dimensional view point representation of a first location point in the three-dimensional scene based on a sensor model representation, wherein the sensor model representation is generated using a sensor system having a perspective external to the first location point;
  a data manager configured to determine a data representation from the first two-dimensional view point representation without finding three-dimensional coordinates of the first location point, wherein the data manager is further configured to derive from the first two-dimensional view point representation a second two-dimensional view point representation, the data manager further configured to derive a distance measurement value between the first location point and a second location point in the three-dimensional scene; and
  a renderer configured to insert the data representation and the distance measurement value into one of the first and second two-dimensional view point representations.

10. The system of claim 9, wherein the sensor system comprises an imaging device.

11. The system of claim 9, further comprising: a renderer configured to display a graphical image within a larger image of the three-dimensional scene based upon the data representation.

12. A non-transitory computer readable storage medium having a set of instructions executable by a processor stored thereon, wherein executing of the instructions causes the processor to generate information based on perspectives of a three-dimensional scene by:
  obtaining a first two-dimensional view point representation of a first location point in the three-dimensional scene based on a sensor model representation, wherein the sensor model representation is generated using a sensor system having a perspective external to the first location point; and
  determining a data representation from the first two-dimensional view point representation without finding three-dimensional coordinates of the first location point, wherein the determining the data representation includes deriving from the first two-dimensional view point representation a second two-dimensional view point representation from a second perspective external to the first location point;
  deriving a distance measurement value between the first location point and a second location point in the three-dimensional scene; and
  inserting the data representation and the distance measurement value into one of the first and second two-dimensional view point representations.

* * * * *